United States Patent
Sohn et al.

(10) Patent No.: US 8,024,004 B2
(45) Date of Patent: Sep. 20, 2011

(54) DEVICE HAVING DISPLAY BUTTONS AND DISPLAY METHOD AND MEDIUM FOR THE DEVICE

(75) Inventors: Jun-Il Sohn, Yongin-si (KR); Eun-seok Choi, Yongin-si (KR); Won-chul Bang, Yongin-si (KR); Dong-yoon Kim, Yongin-si (KR); Yeun-bae Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 987 days.

(21) Appl. No.: 11/704,256

(22) Filed: Feb. 9, 2007

(65) Prior Publication Data

US 2007/0270178 A1 Nov. 22, 2007

(30) Foreign Application Priority Data

May 17, 2006 (KR) ........................ 10-2006-0044397

(51) Int. Cl.
*H04B 1/38* (2006.01)
*H04M 1/00* (2006.01)

(52) U.S. Cl. ..................................... 455/566; 455/550.1

(58) Field of Classification Search ............... 455/550.1, 455/566, 90.1, 90.2, 557, 575.1, 90.3, 158.4, 455/158.5, 159.1, 1, 59.2, 556.2, 127.4; 345/173
See application file for complete search history.

(56) References Cited

U.S. PATENT DOCUMENTS

| | | | |
|---|---|---|---|
| 5,914,676 A | 6/1999 | Akpa | 341/23 |
| 6,256,020 B1 | 7/2001 | Pabon et al. | 341/23 |
| 6,798,359 B1 | 9/2004 | Ivancic | 345/172 |
| 2006/0094480 A1* | 5/2006 | Tanaka | 455/575.1 |
| 2006/0197753 A1 | 9/2006 | Hotelling | 345/173 |
| 2006/0238517 A1 | 10/2006 | King et al. | 345/173 |

FOREIGN PATENT DOCUMENTS

| | | |
|---|---|---|
| CN | 1760822 | 4/2006 |
| JP | 2005-092441 | 4/2005 |
| KR | 1020060057045 | 5/2006 |

OTHER PUBLICATIONS

"Details: Apple files major chameleonic iPod touch display patent", Oct. 26, 2006, http://www.macnn.com/blogs/?p=136 (nine-page article).
Office Action dated Feb. 1, 2007, in corresponding Korean Application No. 10-2006-0044397.
Chinese Office Action dated Mar. 16, 2011, issued in corresponding Chinese Patent Application No. 200710089487.5.

* cited by examiner

*Primary Examiner* — Eugene Yun
(74) *Attorney, Agent, or Firm* — Staas & Halsey LLP

(57) ABSTRACT

Provided is a device and a display method and medium for the device. The device includes a sensing unit sensing the acceleration of gravity affecting the device on fixed coordinates with respect to the device, a calculator calculating a tilted figure of the device using the sensing result, a plurality of buttons displaying a plurality of images in response to a control signal, and a controller generating the control signal for commanding to display images indicated by image data corresponding to the calculation result from among prepared image data.

22 Claims, 23 Drawing Sheets

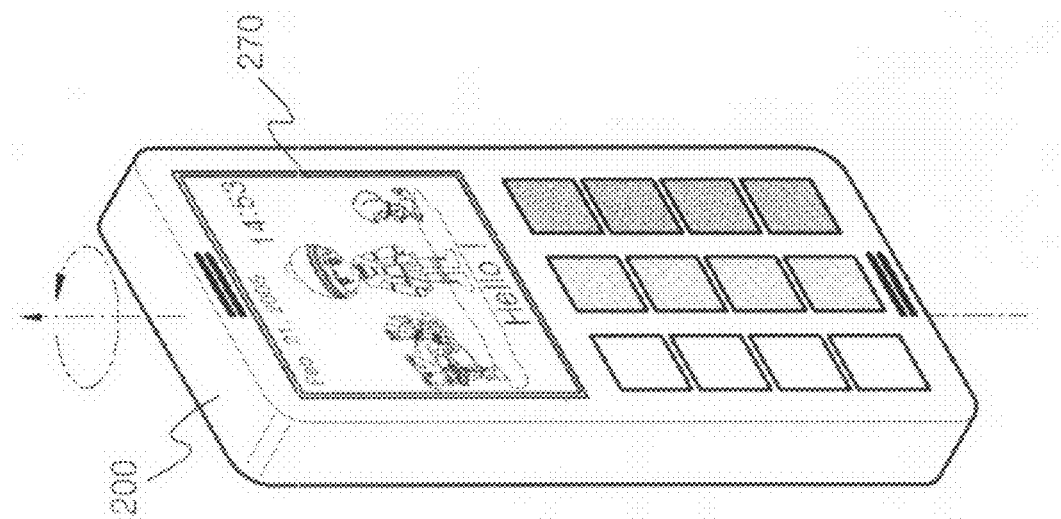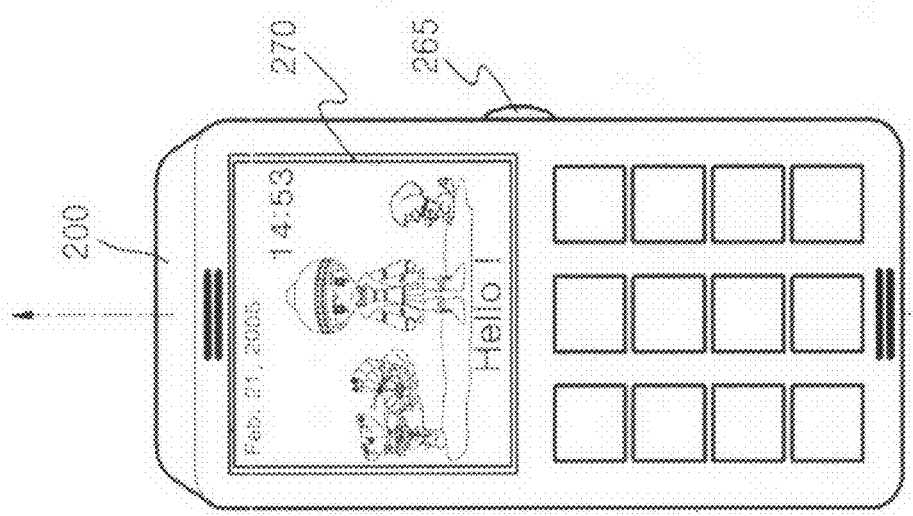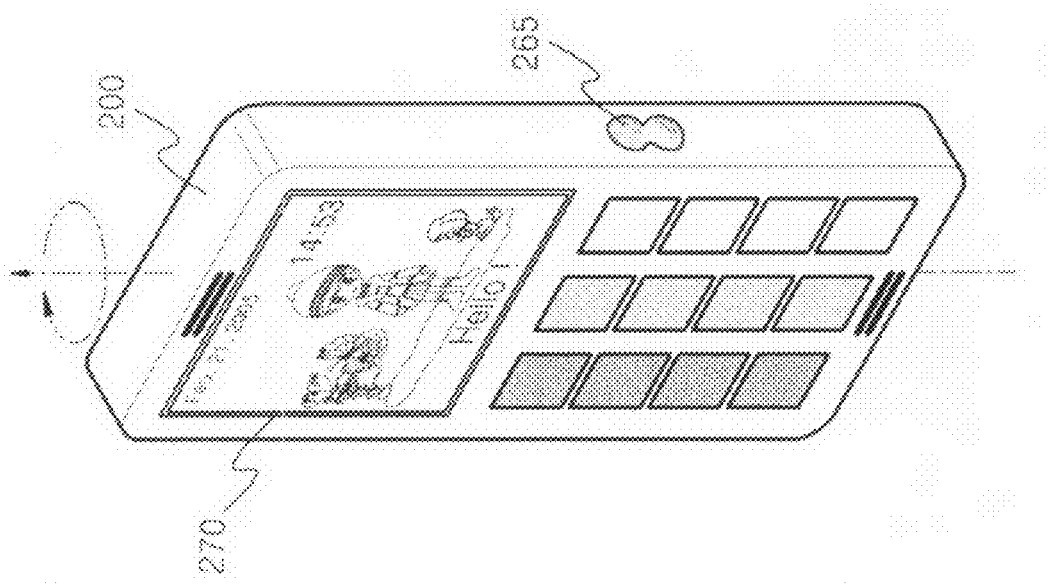

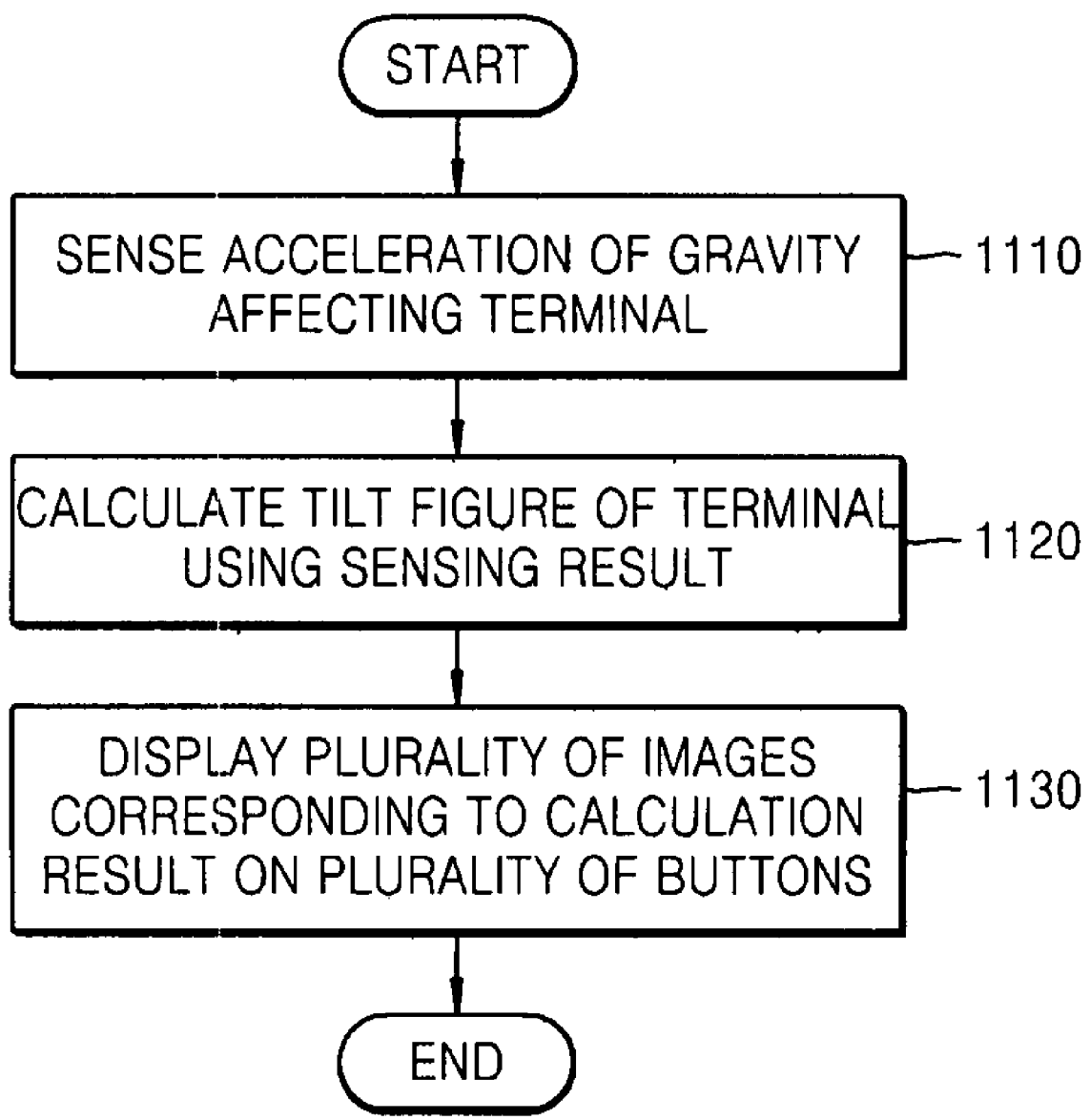

DEVICE HAVING DISPLAY BUTTONS AND DISPLAY METHOD AND MEDIUM FOR THE DEVICE

CROSS-REFERENCE TO RELATED APPLICATIONS

This application claims the benefit of Korean Patent Application No. 10-2006-0044397, filed on May 17, 2006, in the Korean Intellectual Property Office, the disclosure of which is incorporated herein in its entirety by reference.

BACKGROUND OF THE INVENTION

1. Field of the Invention

The present invention relates to a device such as a cellular phone, and more particularly, to a device having image display buttons and a display method and medium for the device.

2. Description of the Related Art

In general, a device, such as a cellular phone, has a plurality of buttons. A user of the device selects a specific function from among various available functions, e.g., a phone call function, a short message editing and sending function, and a video file replay function, available in the device by pressing the plurality of buttons, and the device performs the selected specific function.

Thus, if the number of functions available in the device is larger, the user who wants to select a specific function must perform a larger number of button pressing operations. Considering a recent trend in which cellular phones for performing various functions, such as a phone call function, a music replay function, a video file replay function, and an Internet surfing function, has higher market competitiveness than cellular phones for performing only a simple phone call function, it is predicted that the troublesomeness is profounder in a current button system.

In addition, if the number of functions available in the device is larger, the number of usages of each button is larger, and thus, the size of letters engraved on the surface of each button to represent the usages of the button is smaller, whereby a person having poor sight may feel difficulty when operating each button.

In another way, a method of installing a large number of buttons in a device to reduce the number of user's button inputs can be considered, however, according to a recent trend of following miniaturization of products, the size of buttons included in the device must be smaller, and thus, it may be difficult to operate the buttons.

SUMMARY OF THE INVENTION

Additional aspects, features, and/or advantages of the invention will be set forth in part in the description which follows and, in part, will be apparent from the description, or may be learned by practice of the invention.

The present invention provides a device having a plurality of display buttons to display a plurality of images determined with a tilted figure thereof on the plurality of buttons.

The present invention also provides a device having a plurality of display buttons to display a plurality of images determined with a change of a tilted figure thereof on the plurality of buttons.

The present invention also provides a display method for a device having a plurality of display buttons to display a plurality of images determined with a tilted figure thereof on the plurality of buttons.

The present invention also provides a display method for a device having a plurality of display buttons to display a plurality of images determined with a change of a tilted figure thereof on the plurality of buttons.

According to an aspect of the present invention, there is provided a device including a sensor to sense acceleration of gravity affecting the device on fixed coordinates with respect to the device; a calculator to calculate a tilted figure of the device using sensing result from the sensor; a controller to generate a control signal for commanding display of images, which are indicated by image data corresponding to the titled figure from among predetermined image data; and a plurality of buttons to display the plurality of images in response to the control signal.

According to another aspect of the present invention, there is provided a device including a sensor to sense acceleration of gravity affecting the device on fixed coordinates with respect to the device; a calculator to calculate a tilted figure of the device using sensing result from the sensor; a controller to generate the control signal for commanding display of images, which are indicated by image data corresponding to a trend of a change of the tilted figure from among predetermined image data; and a plurality of buttons to display a plurality of images in response to a control signal.

According to another aspect of the present invention, there is provided a display method for a device having a plurality of buttons, the method including: sensing acceleration of gravity affecting the device on fixed coordinates with respect to the device; calculating a tilted figure of the device using sensing result; and displaying a plurality of images indicated by image data corresponding to the tilted figure from among predetermined image data on the plurality of buttons.

According to another aspect of the present invention, there is provided a display method performed in a device having a plurality of buttons, the method including: displaying a plurality of images corresponding to a plurality of higher-layer functions available in the device on the plurality of buttons; sensing acceleration of gravity affecting the device on fixed coordinates with respect to the device; calculating a tilted figure of the device using sensing result and selecting a higher-layer function corresponding to the tilted figure from among the plurality of higher-layer functions; and displaying a plurality of images corresponding to a plurality of lower-layer functions belonging to the selected higher-layer function on the plurality of buttons.

According to another aspect of the present invention, there is provided a display method performed in a device having a plurality of buttons, the method including: sensing acceleration of gravity affecting the device on fixed coordinates with respect to the device; calculating a tilted figure of the device using the sensing result; and displaying a plurality of images indicated by image data corresponding to a trend of a change of the tilted figure from among predetermined image data on the plurality of buttons.

According to another aspect of the present invention, there is provided a device including: a plurality of buttons to display a plurality of images corresponding to a plurality of higher-layer functions available in the device; a sensor to sense acceleration of gravity affecting the device on fixed coordinates with respect to the device; and a calculator to calculate a tilted figure of the device using sensing result and selecting a higher-layer function corresponding to the tilted figure from among the plurality of higher-layer functions displayed on the display buttons, wherein the plurality of buttons display a plurality of images corresponding to a plurality of lower-layer functions belonging to the selected higher-layer function on the plurality of buttons in place of the plurality of images corresponding to the plurality of higher-level functions.

According to another aspect of the present invention, there is provided at least one computer readable medium storing computer readable instructions that control at least one processor to implement the methods of the present invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIGS. 10A through 10C are reference diagrams for explaining buttons of the cellular phone illustrated in FIG. 2, the brightness of backlight or displayed images on which is determined with a tilted figure of the cellular phone, according to an exemplary embodiment of the present invention; and FIG. 11 is a flowchart illustrating a display method for a device having display buttons according to an exemplary embodiment of the present invention.

DETAILED DESCRIPTION OF THE PREFERRED EMBODIMENTS

Figure 1:
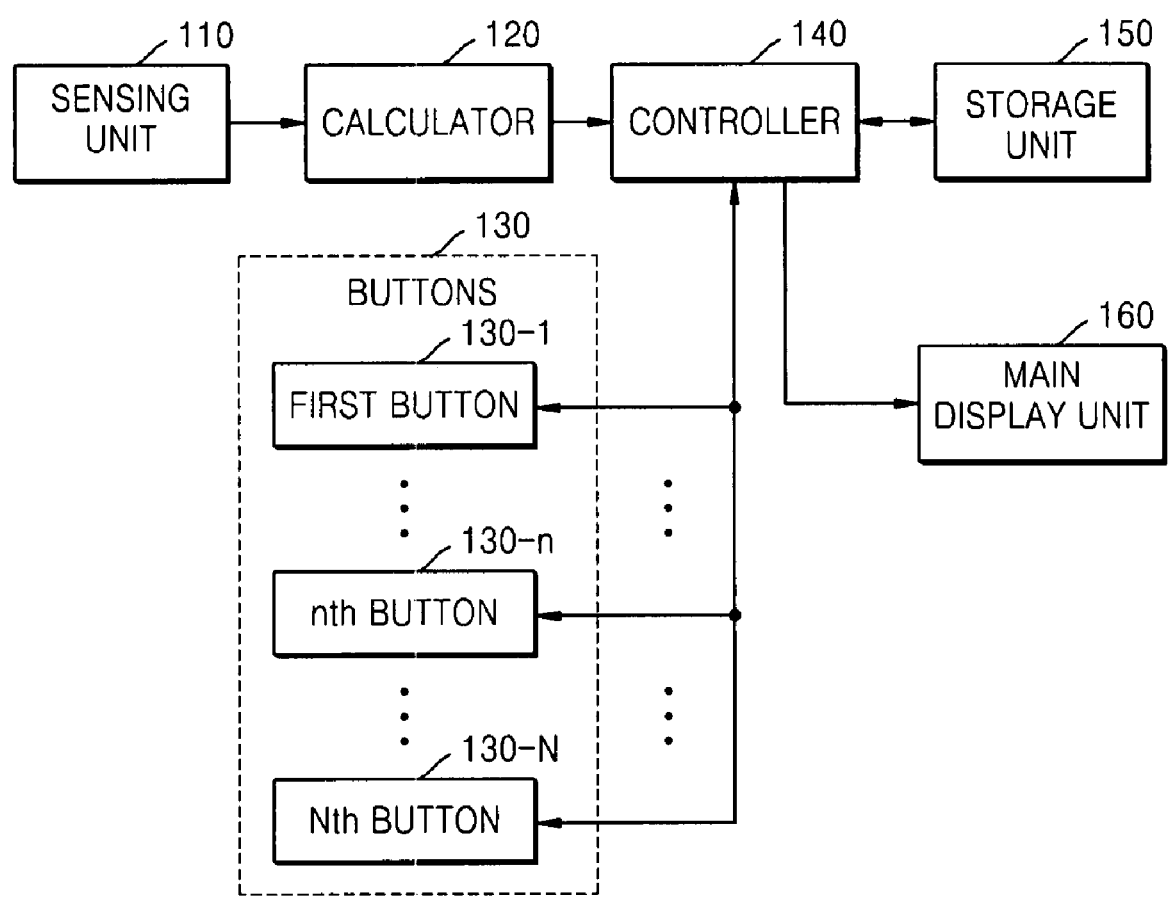
FIG. 1 is a block diagram for explaining a device having display buttons according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, exemplary embodiments of a device having display buttons and a display method and medium for the device are described with reference to the drawings. Examples of a device include a cellular phone, personal digital assistant, MP3 player, digital camera, portable media player, and portable game player. However, it is understood that the present invention is also applicable to any device with which display buttons can be used.

FIG. 1 is a block diagram for explaining a device having display buttons according to an exemplary embodiment of the present invention. Referring to FIG. 1, the device includes a sensing unit (sensor) 110, a calculator 120, a plurality of buttons 130, a controller 140, a storage unit 150, and a main display unit (main display) 160. The plurality of buttons 130 include a first button 130-1 through an $N^{th}$ button 130-N. Herein, n and N are integers where $1 \leq n \leq N$ (N is greater than 2).

The sensing unit 110 can be implemented using an acceleration sensor. In detail, the sensing unit 110 can sense the acceleration of gravity affecting the device on fixed coordinates with respect to the device. The fixed coordinates with respect to the device indicate coordinates tilted as well as the device is tilted. For convenience of description, it is assumed that the fixed coordinates with respect to the device are 3-dimensional coordinates constituted of x, y, and z axes orthogonal to each other. In this case, if the device is tilted, x, y, and z directions are also tilted. For example, if the device is tilted by 30° in the west, all of the x, y, and z directions are also tilted by 30° in the west. That is, if the fixed coordinates with respect to the device are constituted of x, y, and z axes orthogonal to each other, the sensing unit 110 can sense the acceleration of gravity affecting the device with respect to each component of the x, y, and z axes. If the device is tilted, each axis component of the acceleration of gravity sensed by the sensing unit 110 is changed. For example, when the device is not tilted in any direction, if only a z-axis component of the acceleration of gravity affecting the device exists, when the device is tilted, the z-axis component of the acceleration of gravity affecting the device decreases, and at least one of x-axis and y-axis components of the acceleration of gravity increases.

The sensing unit 110 may be activated when a predetermined button included in the device is operated. Herein, the operation can be pressing or touching. That is, to operate a button is for a user to press the predetermined button or to touch a fingertip on the predetermined button.

The sensing unit 110 can be activated when the user continuously presses the predetermined button and inactivated when the user releases a finger from the predetermined button. Likewise, the sensing unit 110 can be activated when the user continuously touches the predetermined button and inactivated when the user releases a finger from the predetermined button.

The sensing unit 110 can be activated only when an operation of the predetermined button begins and when the operation of the predetermined button ends.

The sensing unit 110 can be activated when the user presses the predetermined button and inactivated when the user presses the predetermined button again. Likewise, the sensing unit 110 can be activated when the user touches the predetermined button and inactivated when the user touches the predetermined button again.

As described above, the sensing unit 110 may be intermittently activated.

Hereinafter, for convenience of description, it is assumed that the device is not tilted when an operation of the sensing unit 110 begins. It is also assumed that the sensing unit 110 is activated while the user is pressing the predetermined button.

The sensing unit 110 outputs a sensing result to the calculator 120.

The calculator 120 can calculate a tilted figure of the device using the sensing result input from the sensing unit 110. In exemplary embodiments, the tilted figure of the device indicates at least one of a tilted direction of the device and a tilted degree of the device.

According to a first exemplary embodiment of the present invention, the calculator 120 calculates a tilted figure of the device when the user releases a finger from the predetermined button. To do this, the calculator 120 can calculate the tilted figure of the device using the latest sensing result among sensing results input from the sensing unit 110.

According to a second exemplary embodiment of the present invention, the calculator 120 calculates a tilted figure of the device every time the user presses the predetermined button. To do this, the calculator 120 can calculate temporal tilted figures of the device using every sensing result input from the sensing unit 110.

The plurality of buttons 130 display a plurality of images, e.g., N images, in response to a control signal. To do this, the plurality of buttons 130-1, ..., 130-n, ..., 130-N include a sub-display unit (not shown) displaying the plurality of images in response to the control signal. The sub-display unit may be implemented using a single display panel.

The controller 140 generates the control signal.

According to the first exemplary embodiment of the present invention, the control signal is a signal for commanding to display a plurality of images indicated by image data corresponding to 'the tilted figure of the device' calculated by the calculator 120 from among prepared (predetermined) image data. In detail, a control signal generated in a $k^{th}$ (k is a natural number) time is a signal for commanding to display a plurality of images indicated by image data corresponding to 'a plurality of images displayed in a $(k-1)^{th}$ time on the plurality of buttons 130' and 'a $k^{th}$ tilted figure of the device' from among prepared image data.

According to the second exemplary embodiment of the present invention, the control signal is a signal for commanding to display a plurality of images indicated by image data corresponding to a trend of a change of 'the tilted figure of the device' calculated by the calculator 120 from among prepared image data. In detail, the control signal generated in the $k^{th}$ time is a signal for commanding to display a plurality of images indicated by image data corresponding to 'the plurality of images displayed in the $(k-1)^{th}$ time on the plurality of buttons 130' and 'a $k^{th}$ change of the tilted figure of the device' from among prepared image data.

A plurality of images displayed in the $k^{th}$ time on the plurality of buttons 130 are determined in response to the control signal generated in the $k^{th}$ time by the controller 140. That is, the controller 140 can generate the control signal 'every time an operation of the predetermined button is released after the predetermined button is operated in a state where the device is tilted', and the plurality of images displayed on the plurality of buttons 130 can be updated every time the control signal is generated.

The storage unit 150 can be prepared inside or outside the device having display buttons according to an exemplary embodiment of the present invention. Unlike the storage unit 150, the sensing unit 110, the calculator 120, the plurality of buttons 130, the controller 140, and the main display unit 160 may be prepared inside the device having display buttons according to an exemplary embodiment of the present invention.

The prepared image data is stored in the storage unit 150. In detail, according to the first exemplary embodiment of the present invention, the storage unit 150 may store image data for each tilted figure of the device. According to the second exemplary embodiment of the present invention, the storage unit 150 may store image data for each trend of change of the tilted figure of the device.

Thus, according to the first exemplary embodiment of the present invention, the controller 140 reads image data corresponding to 'the $k^{th}$ tilted figure of the device' from among the prepared image data from the storage unit 150 in the $k^{th}$ time, generates a control signal, which is a signal for commanding to display a plurality of images indicated by the $k^{th}$ read image data, in the $k^{th}$ time, and transmits the $k^{th}$ generated control signal and the $k^{th}$ read image data to the plurality of buttons 130. Accordingly, the plurality of buttons 130 display the plurality of images in the $k^{th}$ time.

According to the second exemplary embodiment of the present invention, the controller 140 reads image data corresponding to 'the $k^{th}$ trend of change of the tilted figure of the device' from among the prepared image data from the storage unit 150 in the $k^{th}$ time, generates a control signal, which is a signal for commanding to display a plurality of images indicated by the $k^{th}$ read image data, in the $k^{th}$ time, and transmits the $k^{th}$ generated control signal and the $k^{th}$ read image data to the plurality of buttons 130. Accordingly, the plurality of buttons 130 display the plurality of images in the $k^{th}$ time.

The main display unit 160 indicates an interface for performing a display function. The main display unit 160 can operate as only an output device for performing the display function or operate as an input/output device such as a touch screen.

Figure 2:
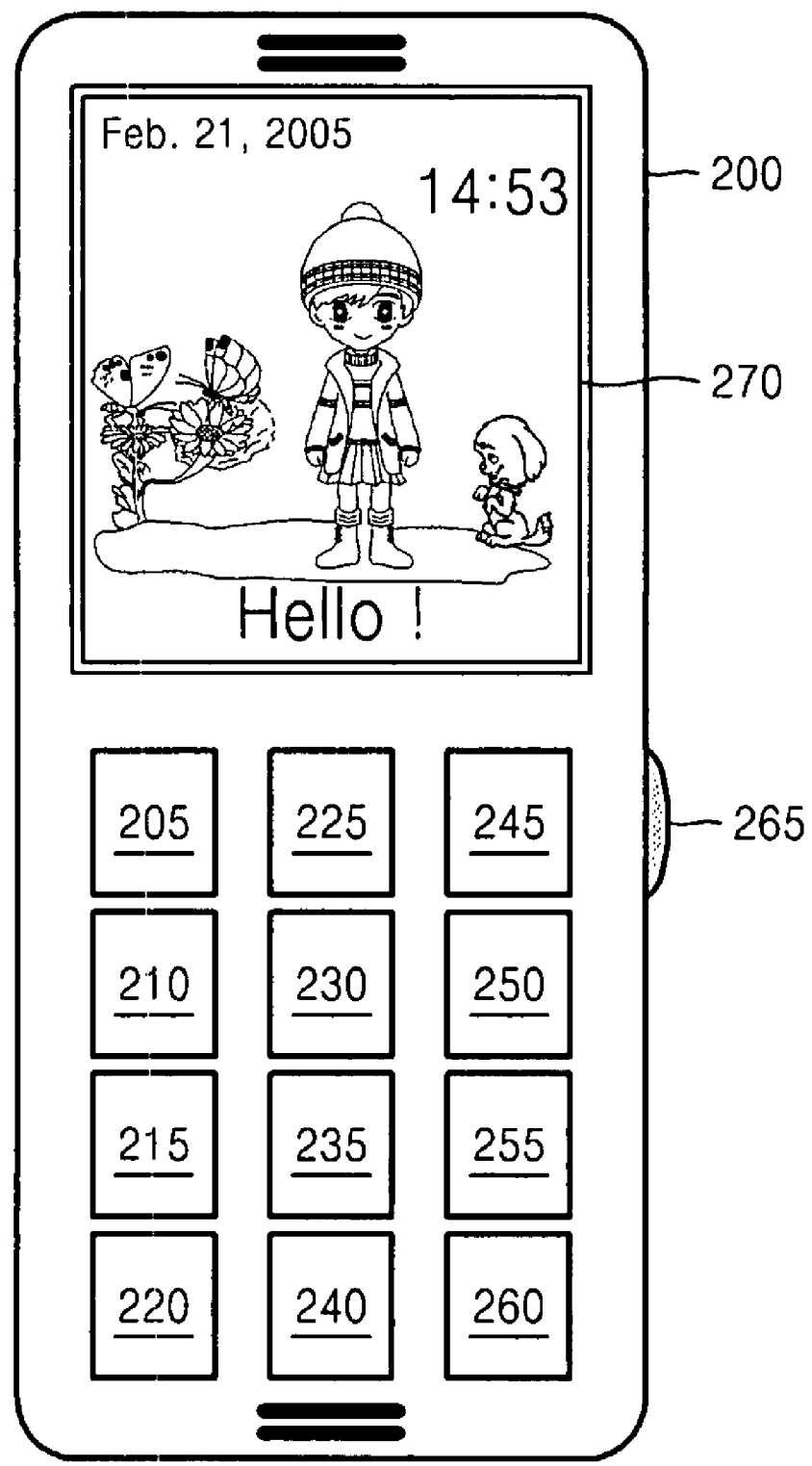
FIG. 2 illustrates an unfolded figure of a folder-type cellular phone having display buttons according to an exemplary embodiment of the present invention.

FIG. 2 illustrates an unfolded figure of a folder-type cellular phone 200 having display buttons according to an exemplary embodiment of the present invention. That is, FIG. 2 illustrates a case where the device according to an exemplary embodiment of the present invention is implemented by the cellular phone 200. The cellular phone 200 includes 13 buttons 205 through 265. In detail, reference numerals 205, 210, 215, 220, 225, 230, 235, 240, 245, 250, 255, 260, and 265 denote first, second, third, fourth, fifth, sixth, seventh, eighth, ninth, tenth, eleventh, twelfth, and thirteenth buttons, respectively. Herein, a plurality of buttons having the display function are the first through twelfth buttons 205 through 260, and the predetermined button described above is the thirteenth button 265. The predetermined button can be a separate button from the plurality of buttons having the display function as illustrated in FIG. 2 or one of the plurality of buttons having the display function not as illustrated in FIG. 2. Reference numeral 270 denotes a display window included in the cellular phone 200. The display window is an implementation example of the main display unit 160 illustrated in FIG. 1.

The plurality of buttons 205 through 260 can display images indicating functions available in the cellular phone 200 as soon as the user unfolds the folder of the cellular phone 200. For example, if the cellular phone 200 can perform a phone call function, a message function, an Internet surfing function, an image capture function, a music search function, a music replay function, a still image search function, a still image reproduction function, a video search function, and a video replay function, the plurality of buttons 205 through 260 can display images indicating the above-described functions.

Hereinafter, for convenience of description, only the first exemplary embodiment of the present invention will be described with reference to FIGS. 3 through 9.

Figure 3:
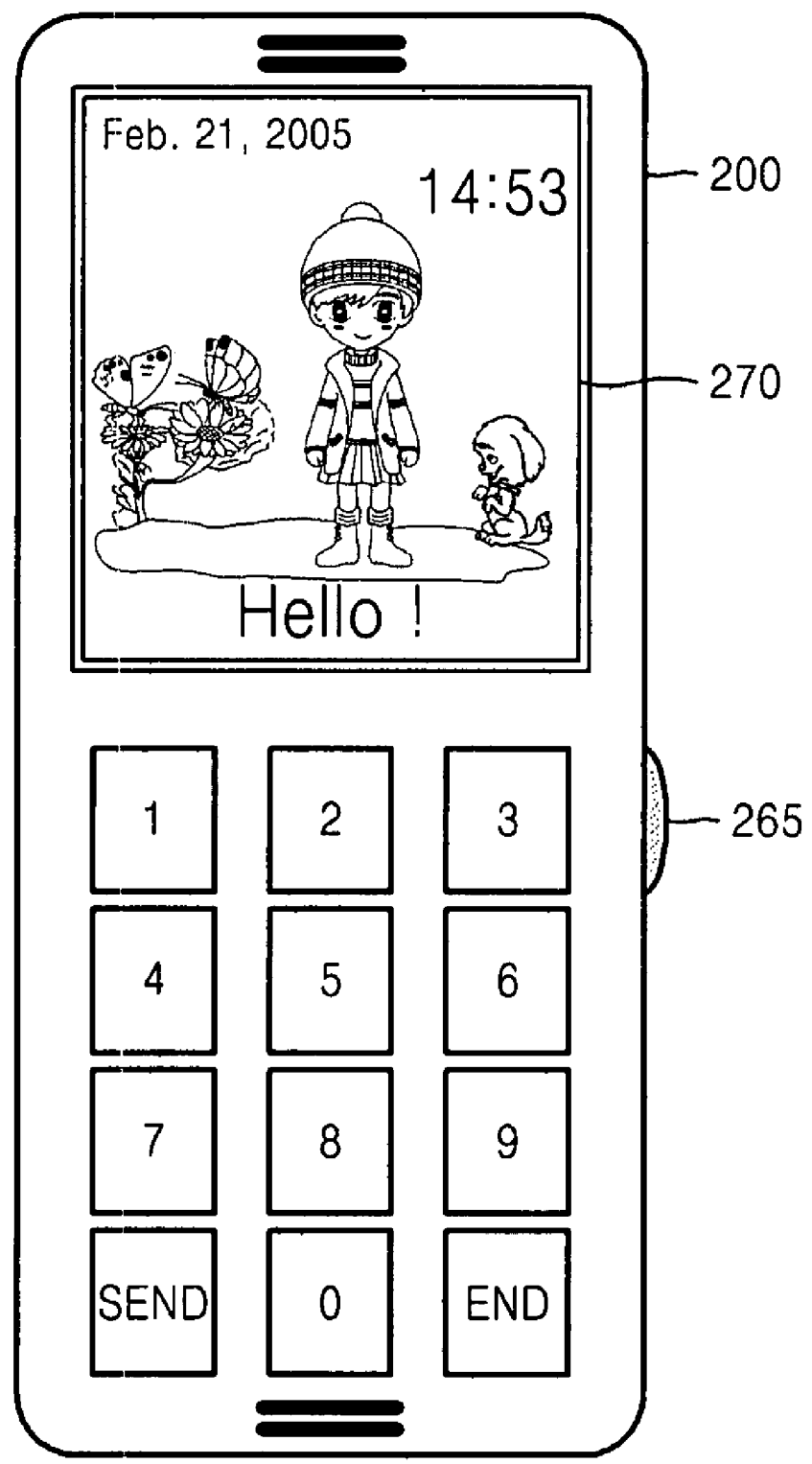
FIG. 3 is a reference diagram for explaining a process of making a call using the cellular phone illustrated in FIG. 2, according to an exemplary embodiment of the present invention.

FIG. 3 is a reference diagram for explaining a process of making a call using the cellular phone 200 illustrated in FIG. 2, according to an exemplary embodiment of the present invention. The user can command the cellular phone 200 to perform the phone call function by operating a button on which an image denoting the phone call function is displayed. That is, the user can command the plurality of buttons 205 through 260 to display an image denoting a call start function, an image denoting a call end function, and numerals 0 through 9 used to input a telephone number as illustrated in FIG. 3 by operating the button on which an image denoting the phone call function is displayed.

Even if the user does not operate the button on which the image denoting the phone call function is displayed, the cellular phone 200 can perform the phone call function. For example, the user can command the plurality of buttons 205 through 260 to display the image denoting the call start function, the image denoting the call end function, and numerals 0 through 9 used to input a telephone number as illustrated in FIG. 3 by releasing a finger from the thirteenth button 265 after tilting the cellular phone 200 by 45° in the north direction with pressing the thirteenth button 265. To do this, the storage unit 150 may store image data, which indicates the image denoting the call start function, the image denoting the call end function, and numerals 0 through 9 used to input a telephone number, as one of image data corresponding to a case where 'the cellular phone 200 is tilted by 45° in the north direction'. In this case, the controller 140 reads the image data, which indicates the image denoting the call start function, the image denoting the call end function, and numerals 0 through 9 used to input a telephone number, as image data corresponding to the case where 'the cellular phone 200 is tilted by 45° in the north direction' (the cellular phone 200 is in an initial state immediately before tilted) from the storage unit 150. The initial state is a state immediately after the folder of the cellular phone 200 is unfolded. The controller 140 generates a control signal for commanding to display the plurality of images indicated by the read image data and transmits the generated control signal and the read image data to the plurality of buttons 130. Accordingly, the plurality of buttons 130, display the image denoting the call start function, the image denoting the call end function, and numerals 0 through 9 used to input a telephone number as illustrated in FIG. 3.

Figure 4:
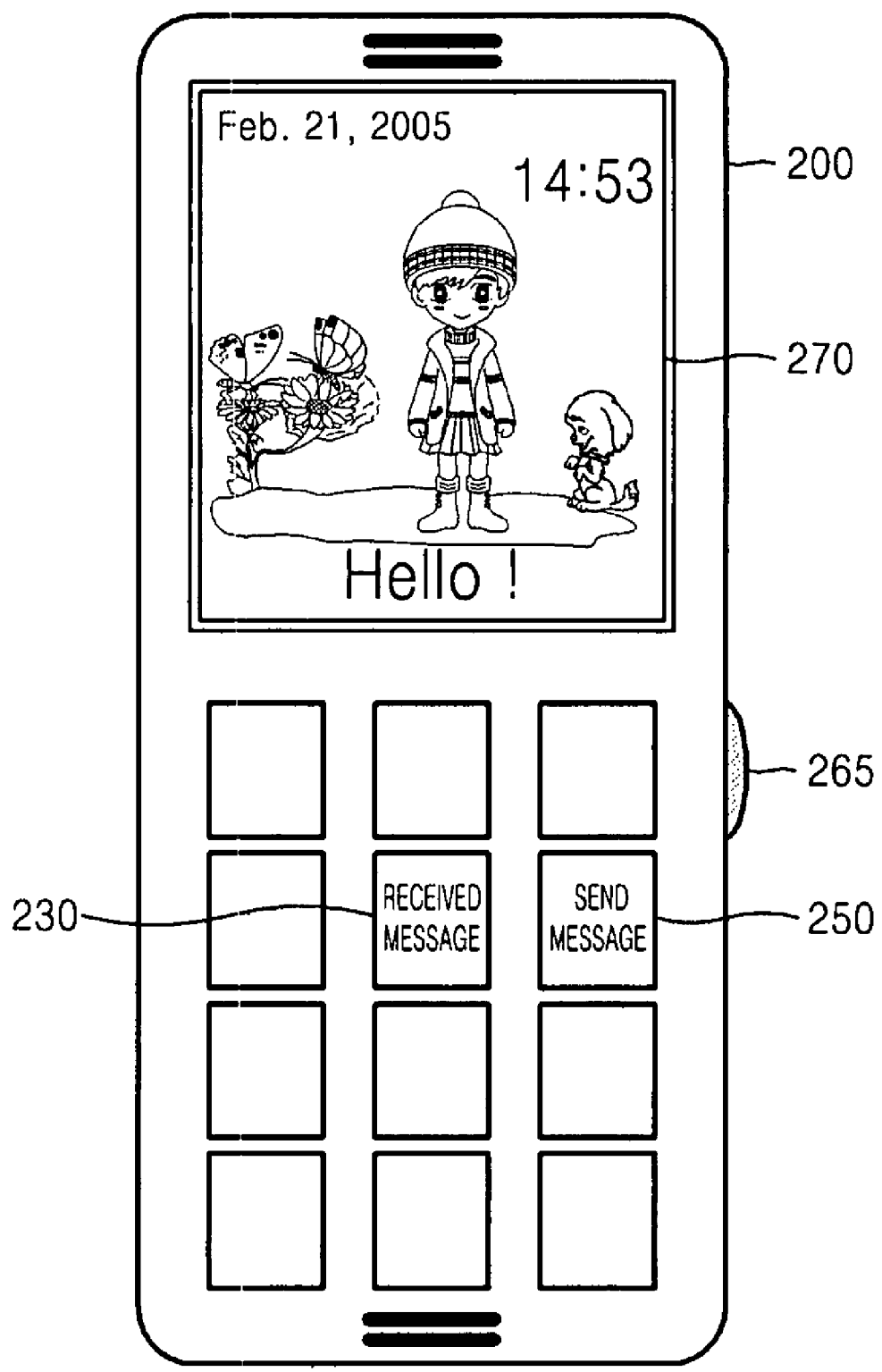
FIG. 4 is a reference diagram for explaining a process of sending or receiving a short message using the cellular phone illustrated in FIG. 2, according to an exemplary embodiment of the present invention.

FIG. 4 is a reference diagram for explaining a process of sending or receiving a short message using the cellular phone 200 illustrated in FIG. 2, according to an exemplary embodiment of the present invention. The user can command the cellular phone 200 to perform the message function by operating a button on which an image denoting the message function is displayed. That is, the user can command the plurality of buttons 205 through 260, in particular, the sixth button 230 and the tenth button 250, to display an image denoting a received message check function and an image denoting a message editing and sending function as illustrated in FIG. 4 by operating the button on which an image denoting the message function is displayed.

Even if the user does not operate the button on which the image denoting the message function is displayed, the cellular phone 200 can perform the message function. For example, the user can command the plurality of buttons 205 through 260 to display the image denoting the received message check function and the image denoting the message editing and sending function as illustrated in FIG. 4 by releasing a finger from the thirteenth button 265 after tilting the cellular phone 200 by 45° in the south direction with pressing the thirteenth button 265. To do this, the storage unit 150 may store image data, which indicates the image denoting the received message check function and the image denoting the message editing and sending function, as one of image data corresponding to a case where 'the cellular phone 200 is tilted by 45° in the south direction'. In this case, the controller 140 reads the image data, which indicates the image denoting the received message check function and the image denoting the message editing and sending function, as image data corresponding to the case where 'the cellular phone 200 is tilted by 45° in the south direction' (the cellular phone 200 is in the initial state immediately before tilted) from the storage unit 150. The controller 140 generates a control signal for commanding to display the plurality of images indicated by the read image data and transmits the generated control signal and the read image data to the plurality of buttons 130. Accordingly, the plurality of buttons 130 display the image denoting the received message check function and the image denoting the message editing and sending function as illustrated in FIG. 4.

Figure 5A:
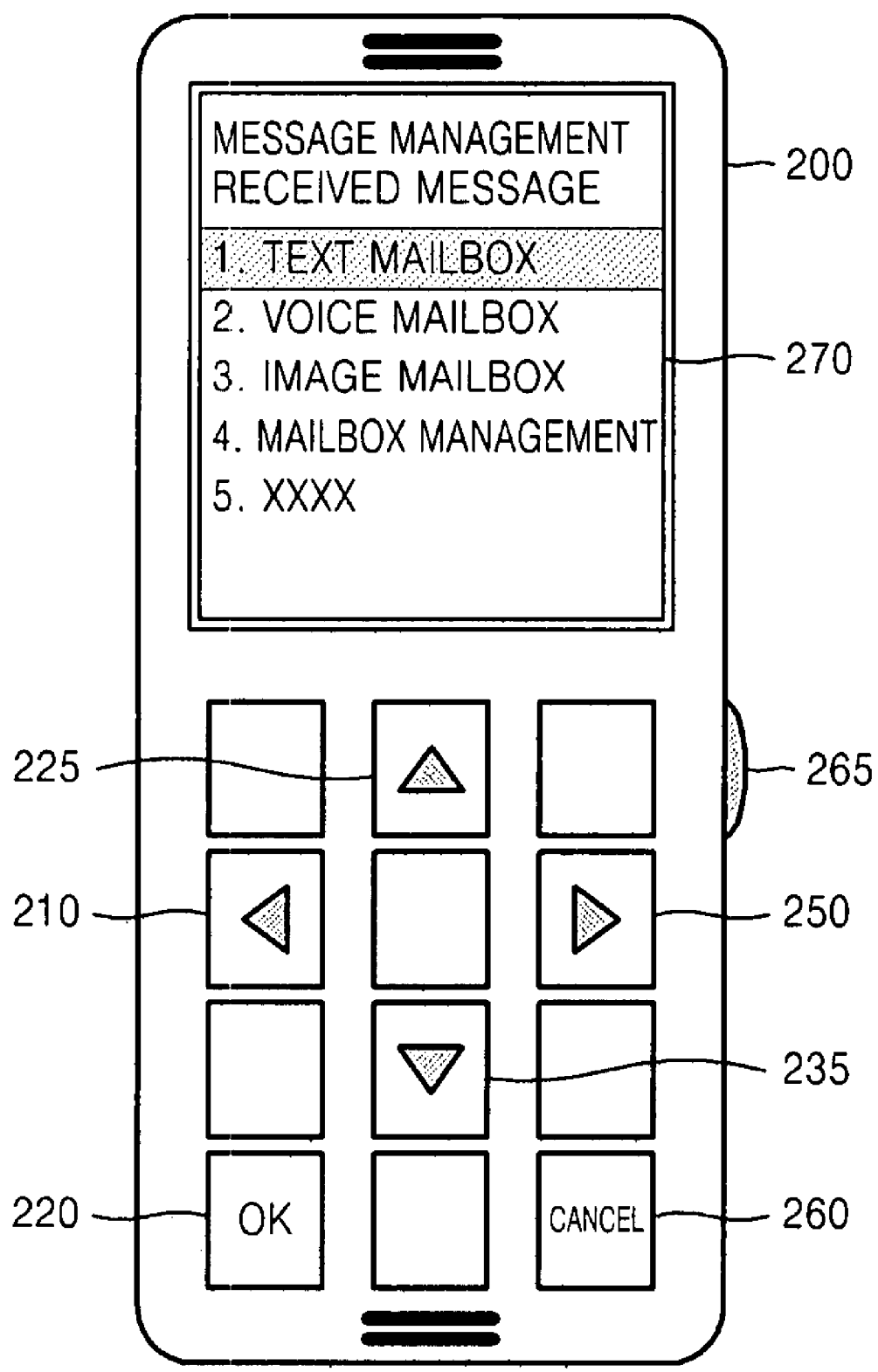
FIGS. 5A through 5C are reference diagrams for explaining a process of checking a received message using the cellular phone illustrated in FIG. 2, according to an exemplary embodiment of the present invention.
Figure 5B:
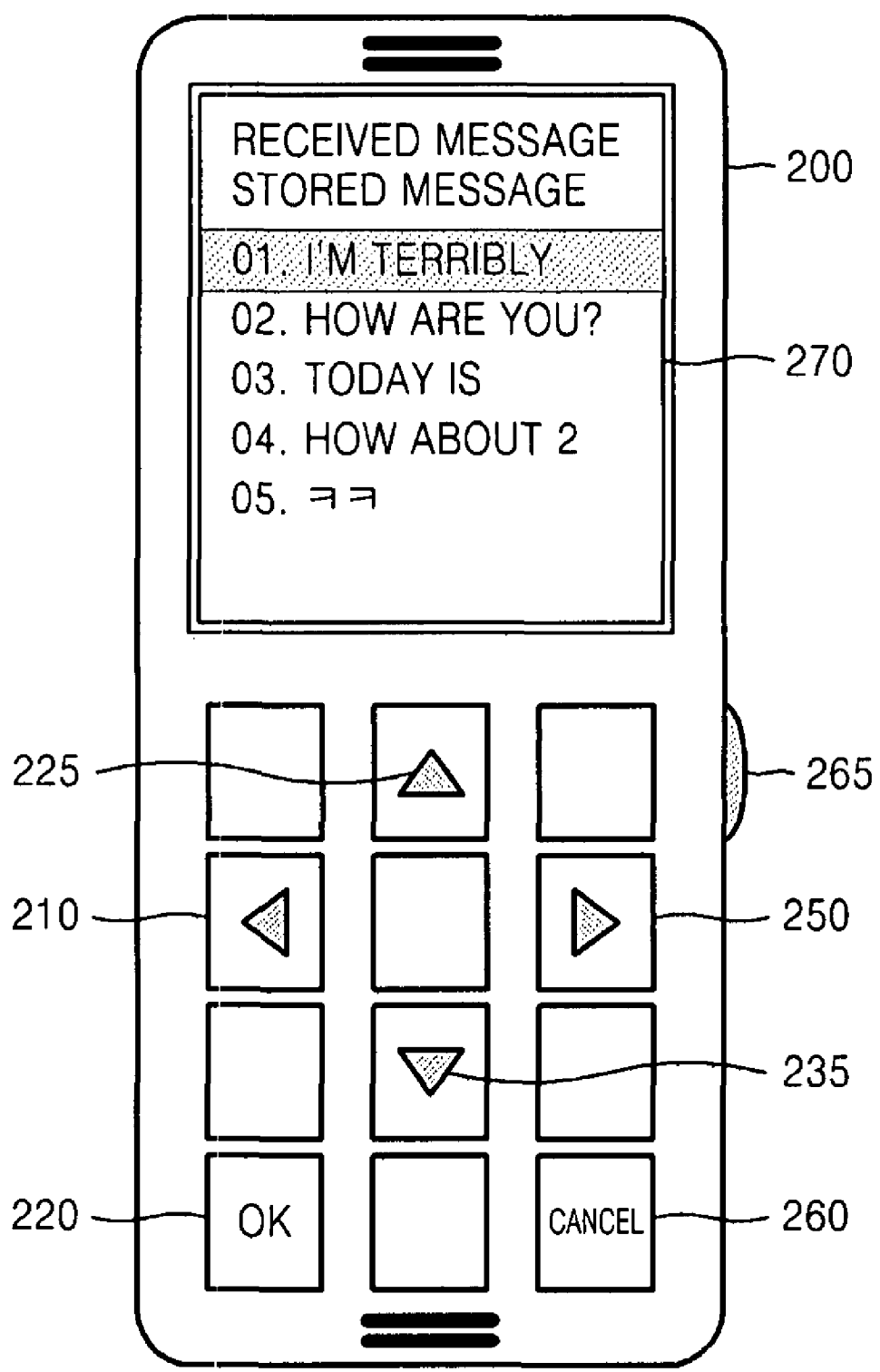
Figure 5C:
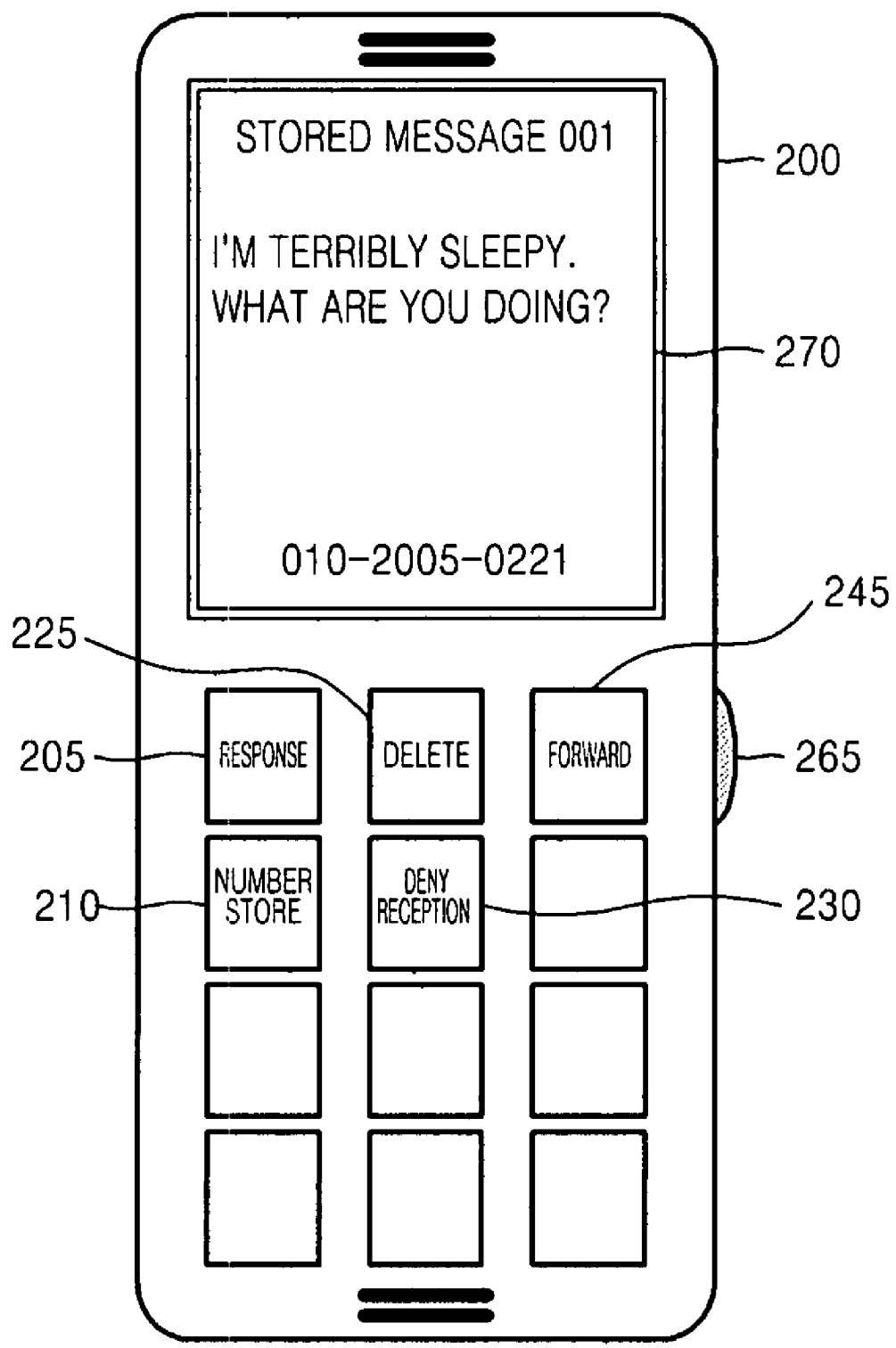

FIGS. 5A through 5C are reference diagrams for explaining a process of checking a received message using the cellular phone 200 illustrated in FIG. 2, according to an exemplary embodiment of the present invention.

It is assumed that if the user operates the sixth button 230 of the cellular phone 200 illustrated in FIG. 4, the display window 270 displays categories, e.g., 'text mailbox', 'voice mailbox', 'image mailbox', and 'mailbox management', related to the checking of a received message and the plurality of buttons 105 through 260 display arrows used to select one of the categories displayed on the display window 270, an image denoting an OK function, and an image denoting a cancel function used to return to a higher-layer function.

Even if the user does not operate the sixth button 230 illustrated in FIG. 4, the plurality of buttons 105 through 260 having a display function can display the arrows used to select one of the categories displayed on the display window 270, the image denoting the OK function, and the image denoting the cancel function. For example, the user can command the plurality of buttons 205 through 260 to display the arrows used to select one of the categories displayed on the display window 270, the image denoting the OK function, and the image denoting the cancel function as illustrated in FIG. 5A by releasing a finger from the thirteenth button 265 after tilting the cellular phone 200 by 45° in the west direction with pressing the thirteenth button 265. To do this, the storage unit 150 may store image data, which indicates the arrows used to select one of the categories displayed on the display window 270, the image denoting the OK function, and the image denoting the cancel function, as one of image data corresponding to a case where 'the cellular phone 200 is tilted by 45° in the west direction'. In this case, the controller 140 reads the image data, which indicates the arrows used to select one of the categories displayed on the display window 270, the image denoting the OK function, and the image denoting the cancel function, as image data corresponding to the case where 'the cellular phone 200 is tilted by 45° in the west direction' (the plurality of buttons 205 through 260 display the image denoting the message function immediately before the cellular phone 200 is tilted) from the storage unit 150. The controller 140 generates a control signal for commanding to display the plurality of images indicated by the read image data and transmits the generated control signal and the read image data to the plurality of buttons 130. Accordingly, the plurality of buttons 130 display the arrows used to select one of the categories displayed on the display window 270, the image denoting the OK function, and the image denoting the cancel function as illustrated in FIG. 5A.

It is assumed that if the user operates the fourth button 220 of the cellular phone 200 illustrated in FIG. 5A, the display window 270 displays short messages stored in the text mailbox and the plurality of buttons 105 through 260 display arrows used to select one of the displayed short messages, the image denoting the OK function, and the image denoting the cancel function. In this case, the display window 270 displays only a beginning portion of each of the short messages.

Even if the user does not operate the fourth button 220 illustrated in FIG. 5A, the plurality of buttons 105 through 260 having a display function can display the arrows used to select one of the short messages displayed on the display window 270, the image denoting the OK function, and the image denoting the cancel function. For example, the user can command the plurality of buttons 205 through 260 to display the arrows used to select one of the short messages displayed on the display window 270, the image denoting the OK function, and the image denoting the cancel function as illustrated in FIG. 5B by releasing a finger from the thirteenth button 265 after tilting the cellular phone 200 by 45° in the west direction with pressing the thirteenth button 265. To do this, the storage unit 150 may store image data, which indicates the arrows used to select one of the short messages displayed on the display window 270, the image denoting the OK function, and the image denoting the cancel function, as one of the image data corresponding to the case where 'the cellular phone 200 is tilted by 45° in the west direction'. In this case, the controller 140 reads the image data, which indicates the arrows used to select one of the short messages displayed on the display window 270, the image denoting the OK function, and the image denoting the cancel function, as image data corresponding to the case where 'the cellular phone 200 is tilted by 45° in the west direction' (the plurality of buttons 205 through 260 display the arrows used to select one of the categories displayed on the display window 270, the image denoting the OK function, and the image denoting the cancel function immediately before the cellular phone 200 is tilted) from the storage unit 150. The controller 140 generates a control signal for commanding to display the plurality of images indicated by the read image data and transmits the generated control signal and the read image data to the plurality of buttons 130. Accordingly, the plurality of buttons 130 display the arrows used to select one of the short messages displayed on the display window 270, the image denoting the OK function, and the image denoting the cancel function as illustrated in FIG. 5B.

It is assumed that if the user operates the fourth button 220 in a state where the first short message is selected as illustrated in FIG. 5B, the display window 270 displays entire contents of the selected short message and the plurality of buttons 105 through 260 display an image denoting a response function, an image denoting a number storage function, an image denoting a delete function, an image denoting a reception deny function for denying receiving of any short message from a cellular phone which has sent the selected short message, and an image denoting a forwarding function for forwarding the selected short message to another cellular phone.

Even if the user does not operate the fourth button 220 illustrated in FIG. 5B, the plurality of buttons 105 through 260 having a display function can display the image denoting the response function, the image denoting the number storage function, the image denoting the delete function, the image denoting the reception deny function, and the image denoting the forwarding function. For example, the user can command the plurality of buttons 205 through 260 to display the image denoting the response function, the image denoting the number storage function, the image denoting the delete function, the image denoting the reception deny function, and the image denoting the forwarding function as illustrated in FIG. 5C by releasing a finger from the thirteenth button 265 after tilting the cellular phone 200 by 45° in the west direction with pressing the thirteenth button 265. To do this, the storage unit 150 may store image data, which indicates the image denoting the response function, the image denoting the number storage function, the image denoting the delete function, the image denoting the reception deny function, and the image denoting the forwarding function, as one of the image data corresponding to the case where 'the cellular phone 200 is tilted by 45° in the west direction'. In this case, the controller 140 reads the image data, which indicates the image denoting the response function, the image denoting the number storage function, the image denoting the delete function, the image denoting the reception deny function, and the image denoting the forwarding function, as image data corresponding to the case where 'the cellular phone 200 is tilted by 45° in the west direction' (the plurality of buttons 205 through 260 display the arrows used to select one of the short messages displayed on the display window 270, the image denoting the OK function, and the image denoting the cancel function immediately before the cellular phone 200 is tilted) from the storage unit 150. The controller 140 generates a control signal for commanding to display the plurality of images indicated by the read image data and transmits the generated control signal and the read image data to the plurality of buttons 130. Accordingly, the plurality of buttons 130 display the image denoting the response function, the image denoting the number storage function, the image denoting the delete function, the image denoting the reception deny function, and the image denoting the forwarding function as illustrated in FIG. 5C.

FIGS. 6A through 6J are reference diagrams for explaining a process of sending a short message using the cellular phone 200 illustrated in FIG. 2, according to an exemplary embodiment of the present invention.

It is assumed that if the user operates the tenth button 250 of the cellular phone 200 illustrated in FIG. 4, the display window 270 displays categories, e.g., 'short message editing', 'voice message editing', and 'mailbox management', related to the sending of a message and the plurality of buttons 105 through 260 display arrows used to select one of the categories displayed on the display window 270, the image denoting the OK function, and the image denoting the cancel function.

Figure 6A:
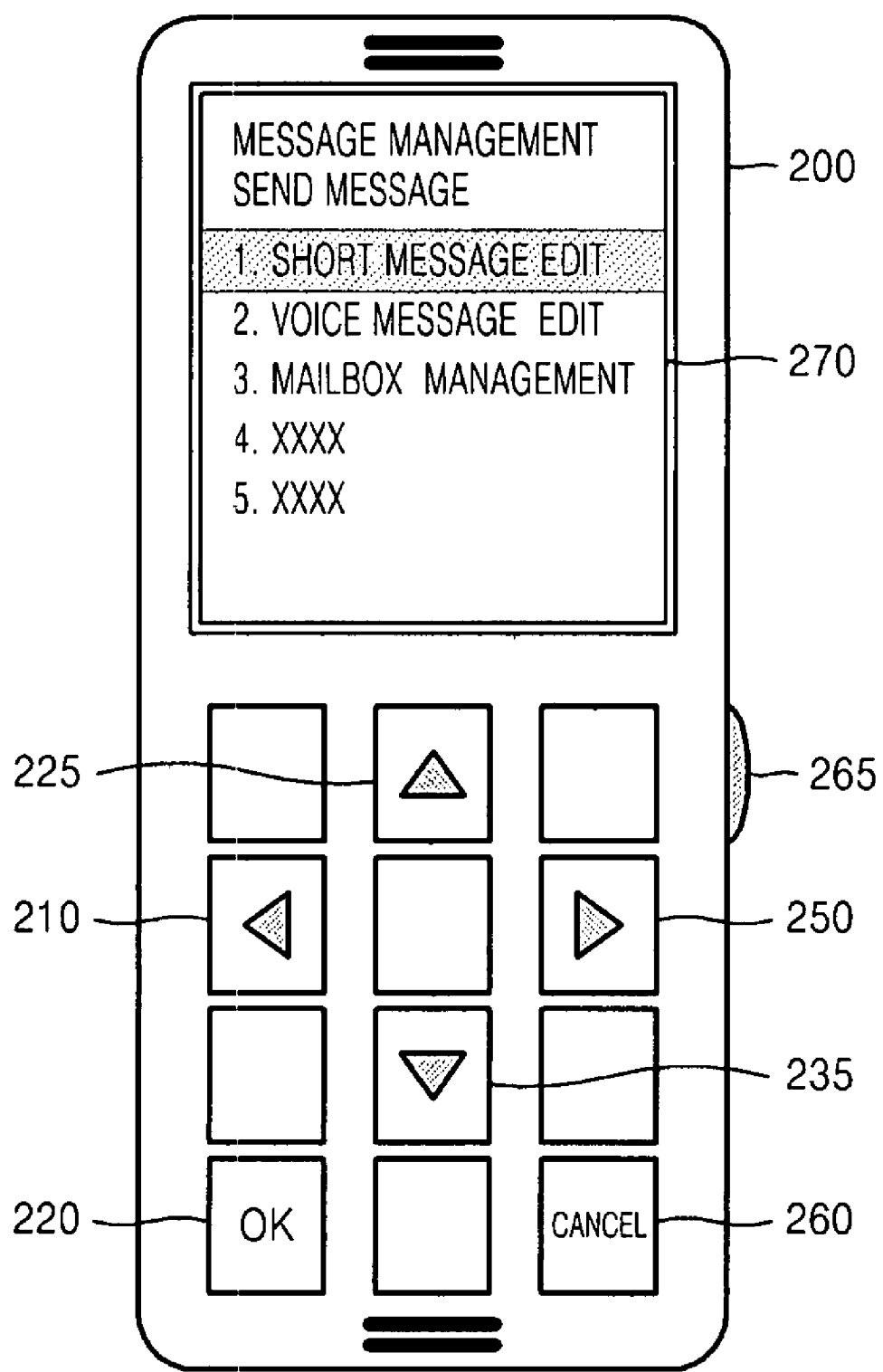
FIGS. 6A through 6J are reference diagrams for explaining a process of sending a short message using the cellular phone illustrated in FIG. 2, according to an exemplary embodiment of the present invention.

Even if the user does not operate the tenth button 250 illustrated in FIG. 4, the plurality of buttons 105 through 260 having a display function can display the arrows used to select one of the categories displayed on the display window 270, the image denoting the OK function, and the image denoting the cancel function. For example, the user can command the plurality of buttons 205 through 260 to display the arrows used to select one of the categories displayed on the display window 270, the image denoting the OK function, and the image denoting the cancel function as illustrated in FIG. 6A by releasing a finger from the thirteenth button 265 after tilting the cellular phone 200 by 45° in the east direction with pressing the thirteenth button 265. To do this, the storage unit 150 may store image data, which indicates the arrows used to select one of the categories displayed on the display window 270, the image denoting the OK function, and the image denoting the cancel function, as one of image data corresponding to a case where 'the cellular phone 200 is tilted by 45° in the east direction'. In this case, the controller 140 reads the image data, which indicates the arrows used to select one of the categories displayed on the display window 270, the image denoting the OK function, and the image denoting the cancel function, as image data corresponding to the case where 'the cellular phone 200 is tilted by 45° in the east direction' (the plurality of buttons 205 through 260 display the image denoting the message function immediately before the cellular phone 200 is tilted) from the storage unit 150. The controller 140 generates a control signal for commanding to display the plurality of images indicated by the read image data and transmits the generated control signal and the read image data to the plurality of buttons 130. Accordingly, the plurality of buttons 130 display the arrows used to select one of the categories displayed on the display window 270, the image denoting the OK function, and the image denoting the cancel function as illustrated in FIG. 6A.

It is assumed that if the user operates the fourth button 220 of the cellular phone 200 illustrated in FIG. 6A, the display window 270 displays categories, e.g., 'new message editing' and 'cellular phone beeper calling', related to the editing of a short message and the plurality of buttons 105 through 260 display arrows used to select one of the categories displayed on the display window 270, the image denoting the OK function, and the image denoting the cancel function.

Figure 6B:
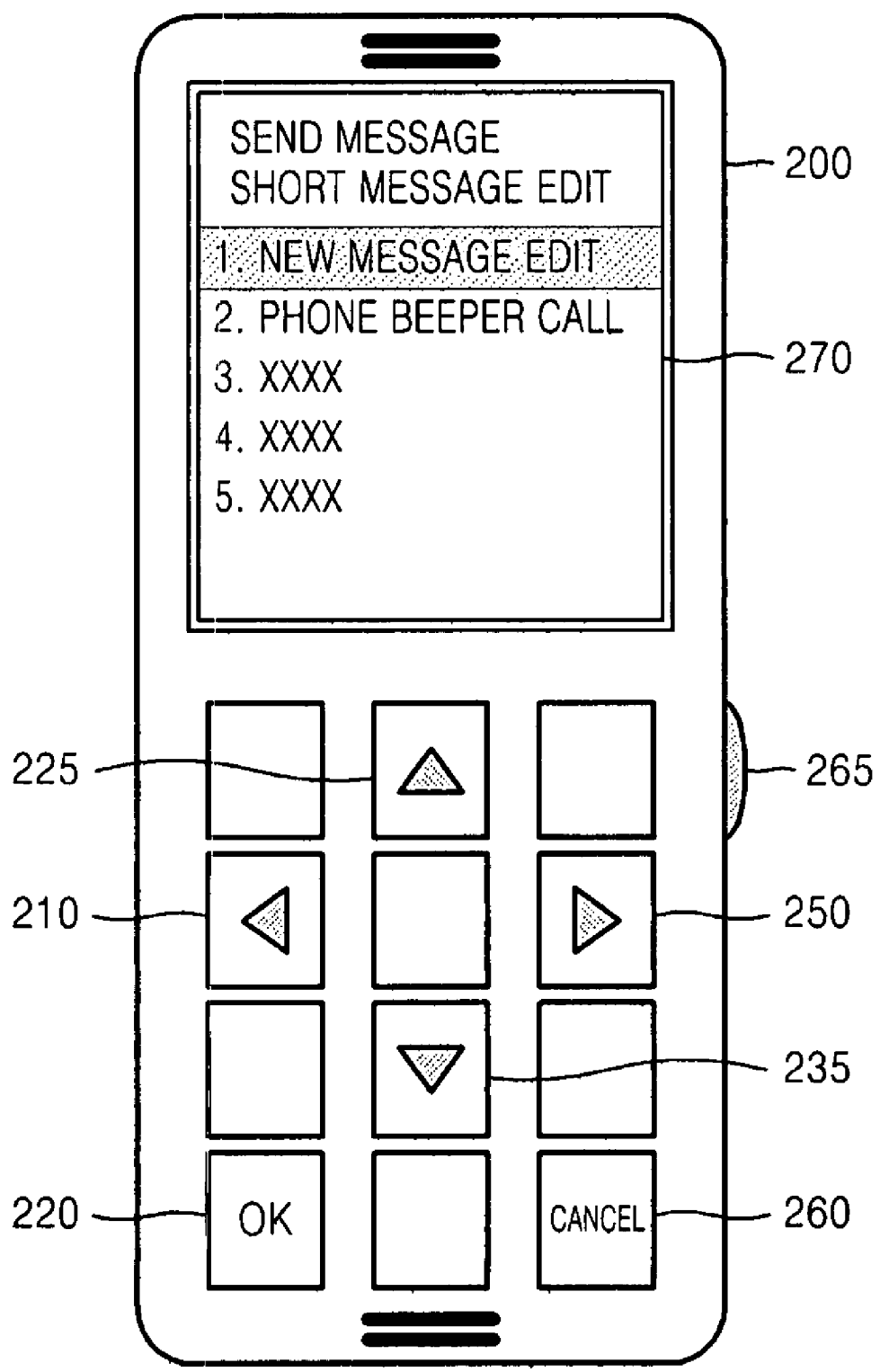

Even if the user does not operate the fourth button 220 illustrated in FIG. 6A, the plurality of buttons 105 through 260 having a display function can display the arrows used to select one of the categories displayed on the display window 270, the image denoting the OK function, and the image denoting the cancel function. For example, the user can command the plurality of buttons 205 through 260 to display the arrows used to select one of the categories displayed on the display window 270, the image denoting the OK function, and the image denoting the cancel function as illustrated in FIG. 6B by releasing a finger from the thirteenth button 265 after tilting the cellular phone 200 by 45° in the east direction with pressing the thirteenth button 265. To do this, the storage unit 150 may store image data, which indicates the arrows used to select one of the categories displayed on the display window 270, the image denoting the OK function, and the image denoting the cancel function, as one of the image data corresponding to the case where 'the cellular phone 200 is tilted by 45° in the east direction'. In this case, the controller 140 reads the image data, which indicates the arrows used to select one of the categories displayed on the display window 270, the image denoting the OK function, and the image denoting the cancel function, as image data corresponding to the case where 'the cellular phone 200 is tilted by 45° in the east direction' (the plurality of buttons 205 through 260 display the arrows used to select one of the categories displayed on the display window 270, the image denoting the OK function, and the image denoting the cancel function immediately before the cellular phone 200 is tilted) from the storage unit 150. The controller 140 generates a control signal for commanding to display the plurality of images indicated by the read image data and transmits the generated control signal and the read image data to the plurality of buttons 130. Accordingly, the plurality of buttons 130 display the arrows used to select one of the categories displayed on the display window 270, the image denoting the OK function, and the image denoting the cancel function as illustrated in FIG. 6B.

It is assumed that if the user operates the fourth button 220 of the cellular phone 200 illustrated in FIG. 6B, the plurality of buttons 205 through 260 display various Korean consonants, various Korean vowels, an image denoting a letter change function, and the image denoting the cancel function.

Figure 6C:
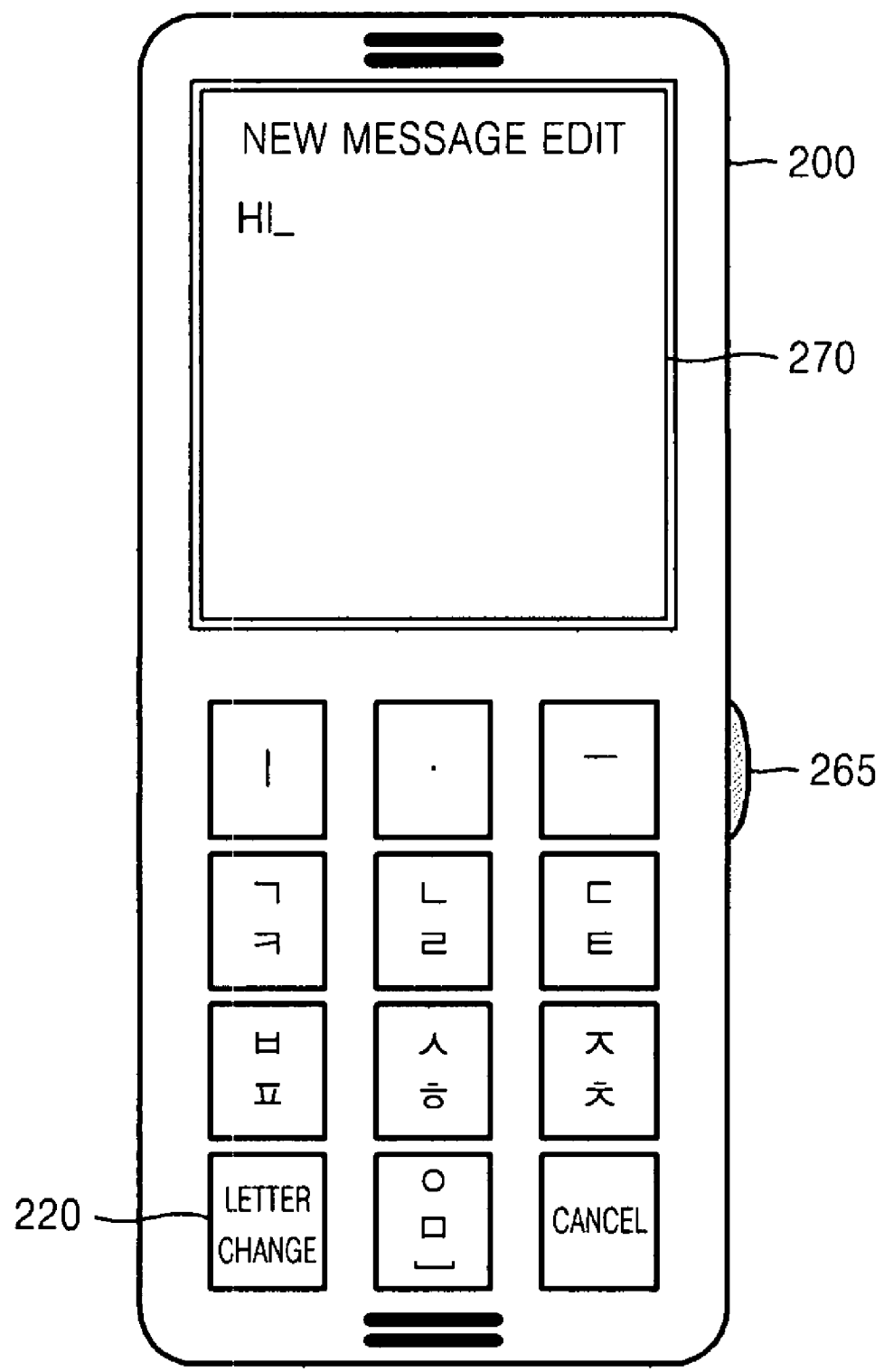

Even if the user does not operate the fourth button 220 illustrated in FIG. 6B, the plurality of buttons 105 through 260 having a display function can display the various Korean consonants, the various Korean vowels, the image denoting the letter change function, and the image denoting the cancel function. For example, the user can command the plurality of buttons 205 through 260 to display the various Korean consonants, the various Korean vowels, the image denoting the letter change function, and the image denoting the cancel function as illustrated in FIG. 6C by releasing a finger from the thirteenth button 265 after tilting the cellular phone 200 by 45° in the east direction with pressing the thirteenth button 265. To do this, the storage unit 150 may store image data, which indicates the various Korean consonants, the various Korean vowels, the image denoting the letter change function, and the image denoting the cancel function, as one of the image data corresponding to the case where 'the cellular phone 200 is tilted by 45° in the east direction'. In this case, the controller 140 reads the image data, which indicates the various Korean consonants, the various Korean vowels, the image denoting the letter change function, and the image denoting the cancel function, as image data corresponding to the case where 'the cellular phone 200 is tilted by 45° in the east direction' (the plurality of buttons 205 through 260 display the arrows used to select one of the categories displayed on the display window 270, the image denoting the OK function, and the image denoting the cancel function immediately before the cellular phone 200 is tilted) from the storage unit 150. The controller 140 generates a control signal for commanding to display the plurality of images indicated by the read image data and transmits the generated control signal and the read image data to the plurality of buttons 130. Accordingly, the plurality of buttons 130 display the various Korean consonants, the various Korean vowels, the image denoting the letter change function, and the image denoting the cancel function as illustrated in FIG. 6C.

It is assumed that if the user operates the fourth button 220 of the cellular phone 200 illustrated in FIG. 6C, the plurality of buttons 205 through 260 display the English alphabet (capitals), the image denoting the letter change function, and the image denoting the cancel function.

Figure 6D:
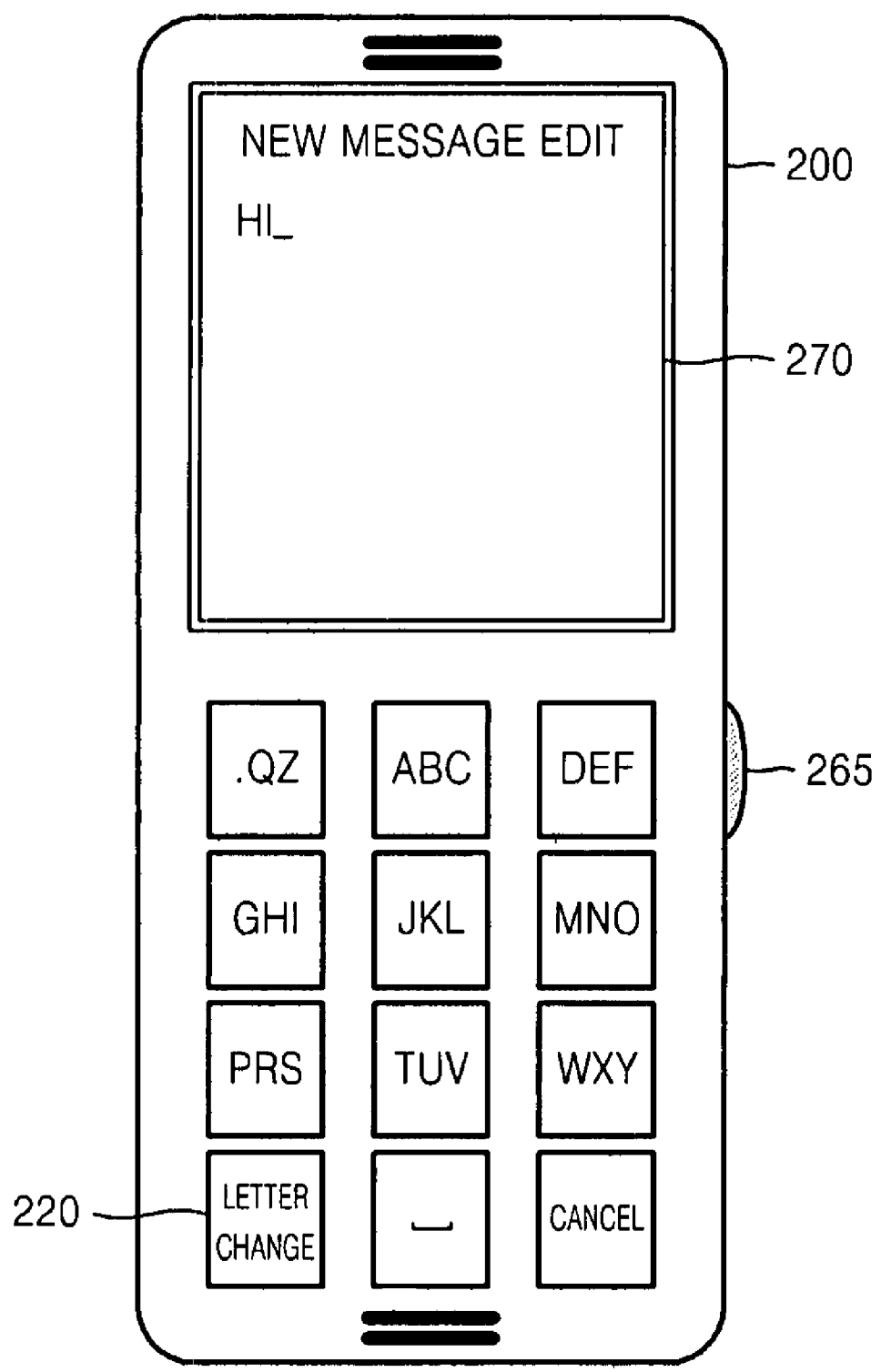

Even if the user does not operate the fourth button 220 illustrated in FIG. 6C, the plurality of buttons 105 through 260 having a display function can display the English alphabet (capitals), the image denoting the letter change function, and the image denoting the cancel function. For example, the user can command the plurality of buttons 205 through 260 to display the English alphabet (capitals), the image denoting the letter change function, and the image denoting the cancel function as illustrated in FIG. 6D by releasing a finger from the thirteenth button 265 after tilting the cellular phone 200 by 45° in the east with pressing the thirteenth button 265. To do this, the storage unit 150 may store image data, which indicates the English alphabet (capitals), the image denoting the letter change function, and the image denoting the cancel function, as one of the image data corresponding to the case where 'the cellular phone 200 is tilted by 45° in the east'. In this case, the controller 140 reads the image data, which indicates the English alphabet (capitals), the image denoting the letter change function, and the image denoting the cancel function, as image data corresponding to the case where 'the cellular phone 200 is tilted by 45° in the east' (the plurality of buttons 205 through 260 display the various Korean consonants, the various Korean vowels, the image denoting the letter change function, and the image denoting the cancel function immediately before the cellular phone 200 is tilted) from the storage unit 150. The controller 140 generates a control signal for commanding to display the plurality of images indicated by the read image data and transmits the generated control signal and the read image data to the plurality of buttons 130. Accordingly, the plurality of buttons 130 display the English alphabet (capitals), the image denoting the letter change function, and the image denoting the cancel function as illustrated in FIG. 6D.

It is assumed that if the user operates the fourth button 220 of the cellular phone 200 illustrated in FIG. 6D, the plurality of buttons 205 through 260 display the English alphabet (lowercase), the image denoting the letter change function, and the image denoting the cancel function.

Figure 6E:
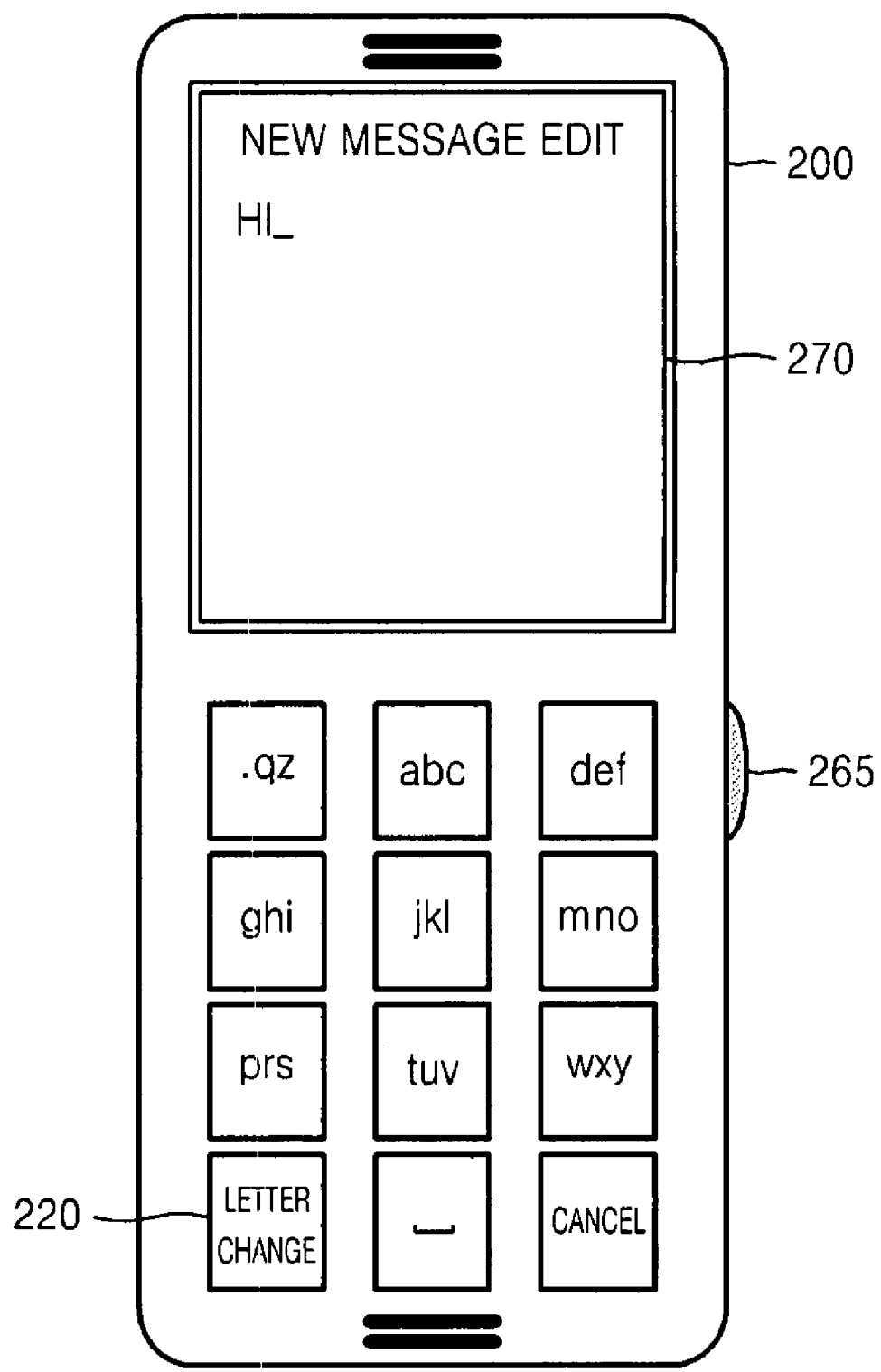

Even if the user does not operate the fourth button 220 illustrated in FIG. 6D, the plurality of buttons 105 through 260 having a display function can display the English alphabet (lowercase), the image denoting the letter change function, and the image denoting the cancel function. For example, the user can command the plurality of buttons 205 through 260 to display the English alphabet (lowercase), the image denoting the letter change function, and the image denoting the cancel function as illustrated in FIG. 6E by releasing a finger from the thirteenth button 265 after tilting the cellular phone 200 by 45° in the east direction with pressing the thirteenth button 265. To do this, the storage unit 150 may store image data, which indicates the English alphabet (lowercase), the image denoting the letter change function, and the image denoting the cancel function, as one of the image data corresponding to the case where 'the cellular phone 200 is tilted by 45° in the east direction'. In this case, the controller 140 reads the image data, which indicates the English alphabet (lowercase), the image denoting the letter change function, and the image denoting the cancel function, as image data corresponding to the case where 'the cellular phone 200 is tilted by 45° in the east direction' (the plurality of buttons 205 through 260 display the English alphabet (capitals), the image denoting the letter change function, and the image denoting the cancel function immediately before the cellular phone 200 is tilted) from the storage unit 150. The controller 140 generates a control signal for commanding to display the plurality of images indicated by the read image data and transmits the generated control signal and the read image data to the plurality of buttons 130. Accordingly, the plurality of buttons 130 display the English alphabet (lowercase), the image denoting the letter change function, and the image denoting the cancel function as illustrated in FIG. 6E.

It is assumed that if the user operates the fourth button 220 of the cellular phone 200 illustrated in FIG. 6E, the plurality of buttons 205 through 260 display various special characters, the image denoting the letter change function, and the image denoting the cancel function.

Figure 6F:
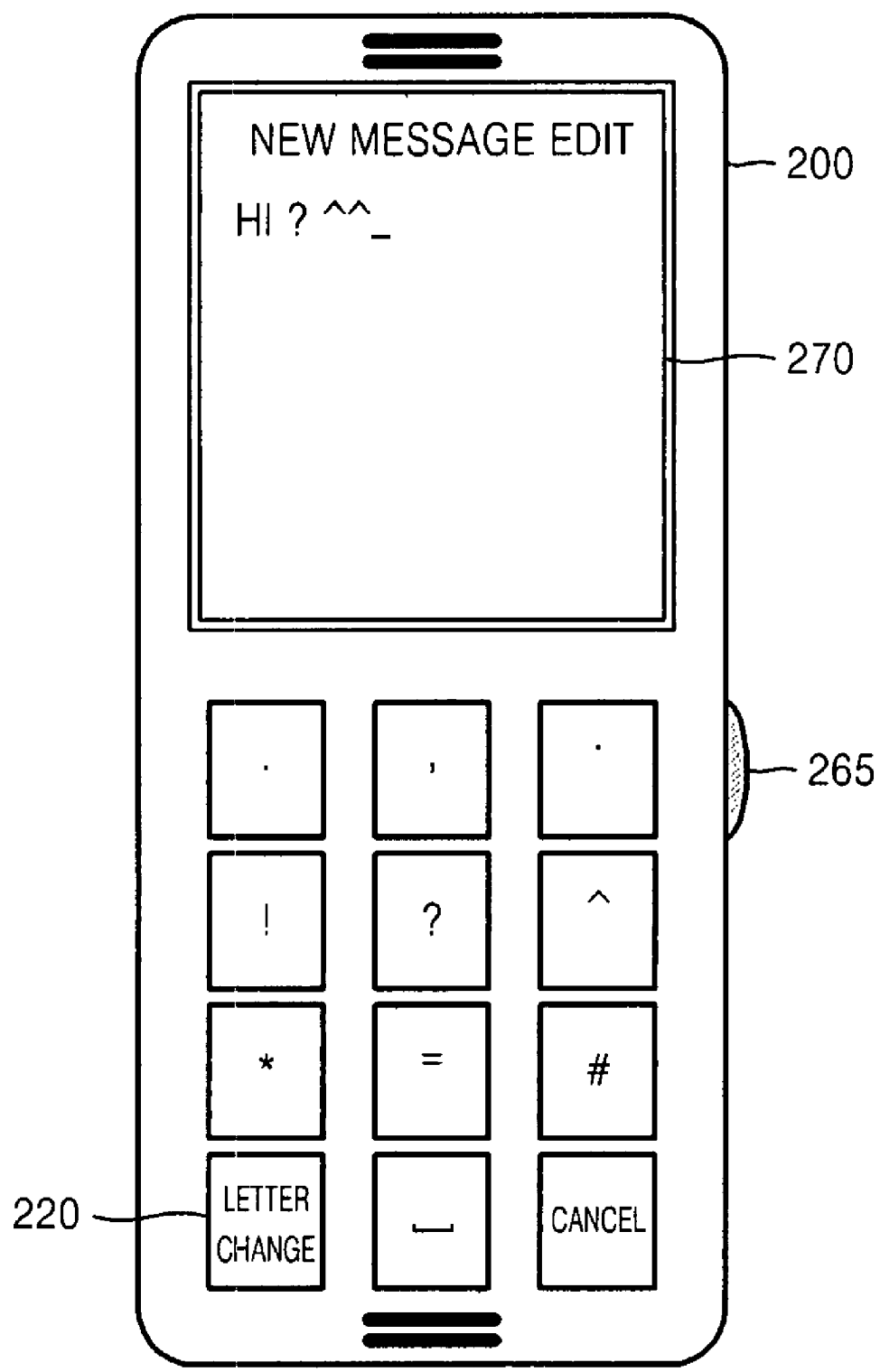

Even if the user does not operate the fourth button 220 illustrated in FIG. 6E, the plurality of buttons 105 through 260 having a display function can display the various special characters, the image denoting the letter change function, and the image denoting the cancel function. For example, the user can command the plurality of buttons 205 through 260 to display the various special characters, the image denoting the letter change function, and the image denoting the cancel function as illustrated in FIG. 6F by releasing a finger from the thirteenth button 265 after tilting the cellular phone 200 by 45° in the east with pressing the thirteenth button 265. To do this, the storage unit 150 may store image data, which indicates the various special characters, the image denoting the letter change function, and the image denoting the cancel function, as one of the image data corresponding to the case where 'the cellular phone 200 is tilted by 45° in the east'. In this case, the controller 140 reads the image data, which indicates the various special characters, the image denoting the letter change function, and the image denoting the cancel function, as image data corresponding to the case where 'the cellular phone 200 is tilted by 45° in the east' (the plurality of buttons 205 through 260 display the English alphabet (lowercase), the image denoting the letter change function, and the image denoting the cancel function immediately before the cellular phone 200 is tilted) from the storage unit 150. The controller 140 generates a control signal for commanding to display the plurality of images indicated by the read image data and transmits the generated control signal and the read image data to the plurality of buttons 130. Accordingly, the plurality of buttons 130 display the various special characters, the image denoting the letter change function, and the image denoting the cancel function as illustrated in FIG. 6F.

It is assumed that if the user operates the fourth button 220 of the cellular phone 200 illustrated in FIG. 6F, the plurality of buttons 205 through 260 display various emoticons, the image denoting the letter change function, and the image denoting the cancel function. The emoticons can be realized by combining various special characters.

Figure 6G:
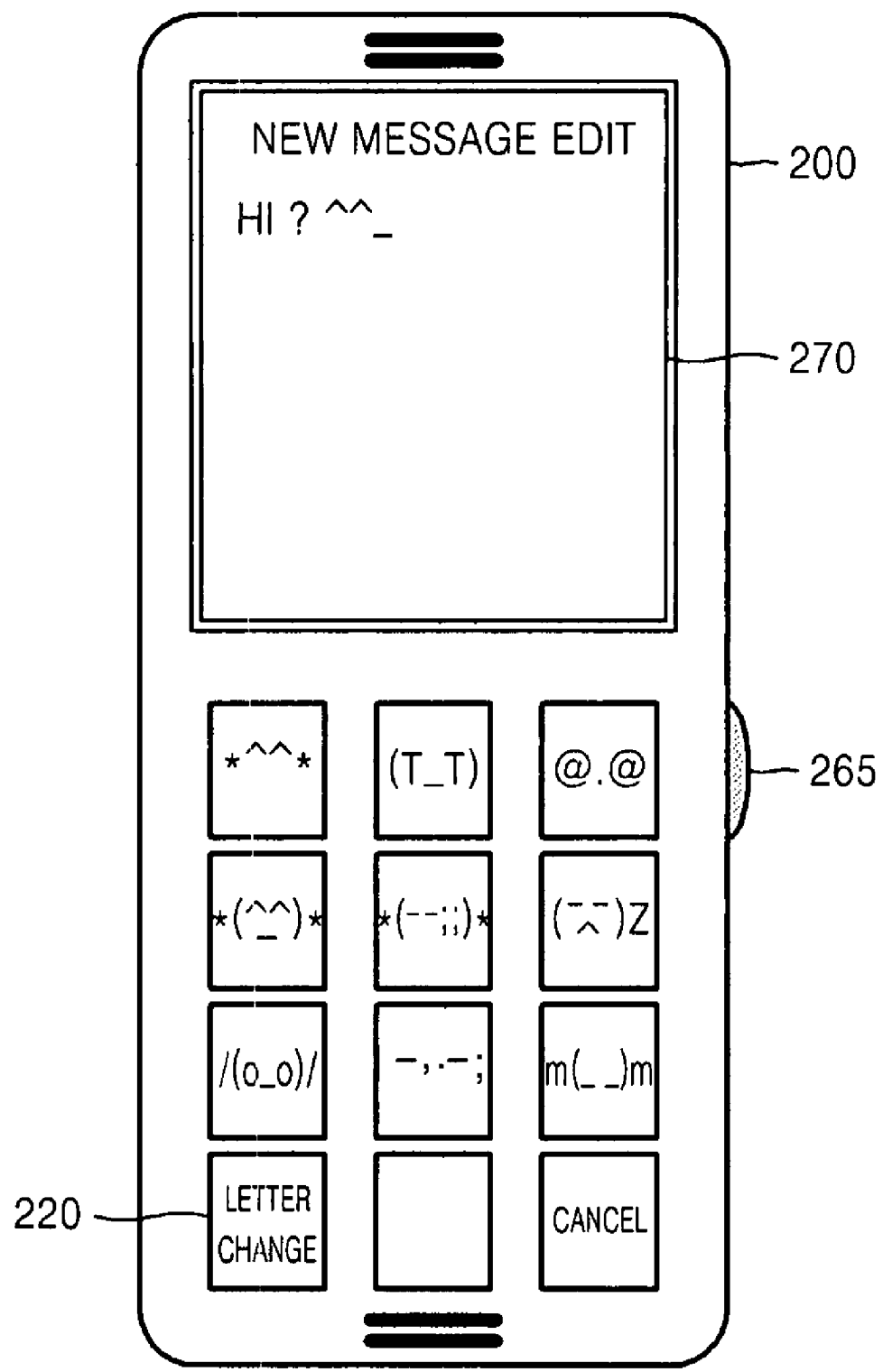

Even if the user does not operate the fourth button 220 illustrated in FIG. 6F, the plurality of buttons 105 through 260 having a display function can display the various emoticons, the image denoting the letter change function, and the image denoting the cancel function. For example, the user can command the plurality of buttons 205 through 260 to display the various emoticons, the image denoting the letter change function, and the image denoting the cancel function as illustrated in FIG. 6G by releasing a finger from the thirteenth button 265 after tilting the cellular phone 200 by 45° in the east direction with pressing the thirteenth button 265. To do this, the storage unit 150 may store image data, which indicates the various emoticons, the image denoting the letter change function, and the image denoting the cancel function, as one of the image data corresponding to the case where 'the cellular phone 200 is tilted by 45° in the east direction'. In this case, the controller 140 reads the image data, which indicates the various emoticons, the image denoting the letter change function, and the image denoting the cancel function, as image data corresponding to the case where 'the cellular phone 200 is tilted by 45° in the east direction' (the plurality of buttons 205 through 260 display the various special characters, the image denoting the letter change function, and the image denoting the cancel function immediately before the cellular phone 200 is tilted) from the storage unit 150. The controller 140 generates a control signal for commanding to display the plurality of images indicated by the read image data and transmits the generated control signal and the read image data to the plurality of buttons 130. Accordingly, the plurality of buttons 130 display the various emoticons, the image denoting the letter change function, and the image denoting the cancel function as illustrated in FIG. 6G.

It is assumed that if the user operates the fourth button 220 of the cellular phone 200 illustrated in FIG. 6G, the plurality of buttons 205 through 260 display numerals 0 through 9, the image denoting the letter change function, and the image denoting the cancel function.

Figure 6H:
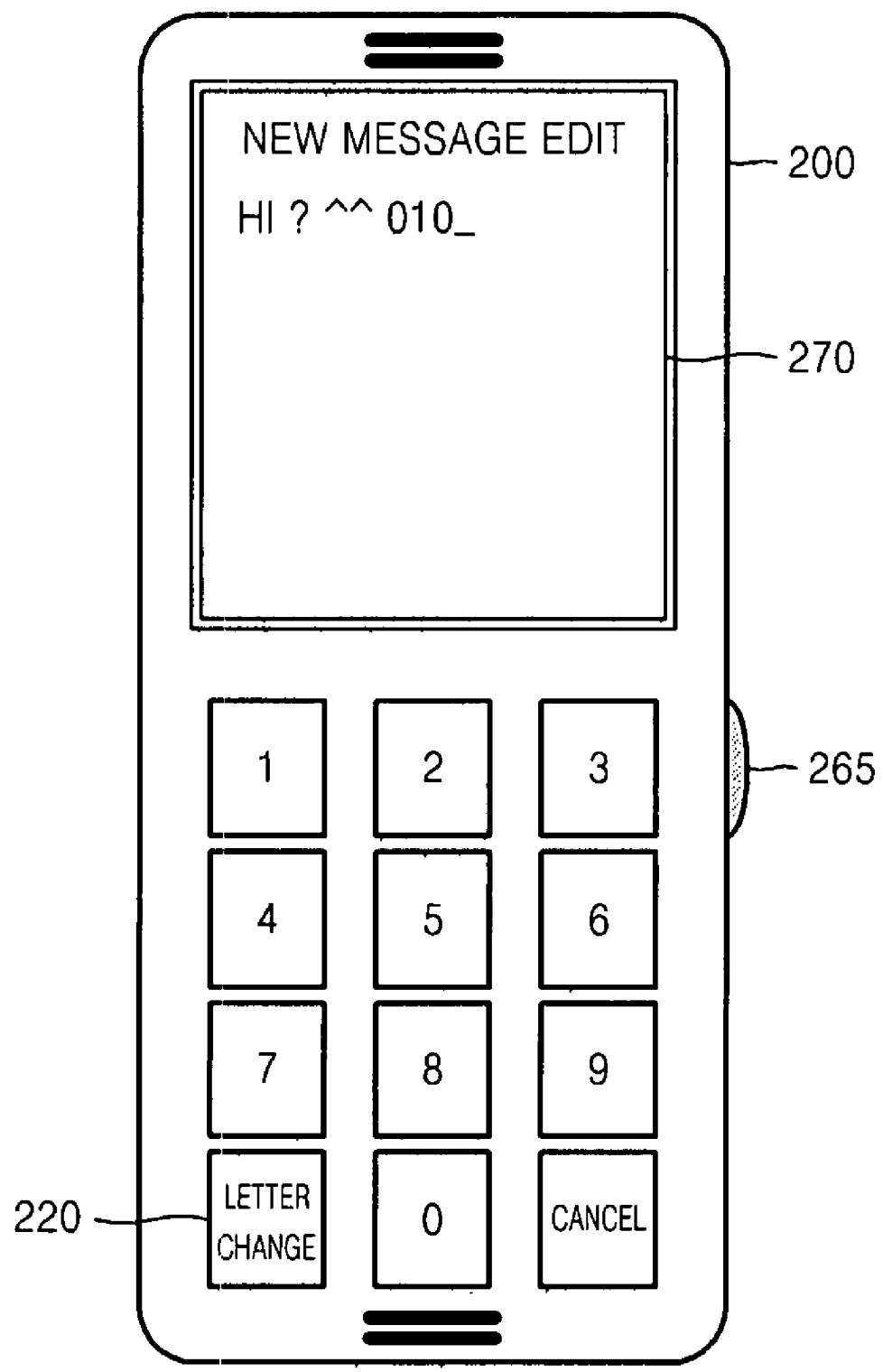

Even if the user does not operate the fourth button 220 illustrated in FIG. 6G, the plurality of buttons 105 through 260 having a display function can display the numerals 0 through 9, the image denoting the letter change function, and the image denoting the cancel function. For example, the user can command the plurality of buttons 205 through 260 to display the numerals 0 through 9, the image denoting the letter change function, and the image denoting the cancel function as illustrated in FIG. 6H by releasing a finger from the thirteenth button 265 after tilting the cellular phone 200 by 45° in the east direction with pressing the thirteenth button 265. To do this, the storage unit 150 may store image data, which indicates the numerals 0 through 9, the image denoting the letter change function, and the image denoting the cancel function, as one of the image data corresponding to the case where 'the cellular phone 200 is tilted by 45° in the east direction'. In this case, the controller 140 reads the image data, which indicates the numerals 0 through 9, the image denoting the letter change function, and the image denoting the cancel function, as image data corresponding to the case where 'the cellular phone 200 is tilted by 45° in the east direction' (the plurality of buttons 205 through 260 display the various emoticons, the image denoting the letter change function, and the image denoting the cancel function immediately before the cellular phone 200 is tilted) from the storage unit 150. The controller 140 generates a control signal for commanding to display the plurality of images indicated by the read image data and transmits the generated control signal and the read image data to the plurality of buttons 130. Accordingly, the plurality of buttons 130 display the numerals 0 through 9, the image denoting the letter change function, and the image denoting the cancel function as illustrated in FIG. 6H.

It is assumed that if the user operates the fourth button 220 of the cellular phone 200 illustrated in FIG. 6H, the plurality of buttons 205 through 260 display the various Korean consonants, the various Korean vowels, the image denoting the letter change function, and an image denoting a cancel/phone-book function.

Figure 6I:
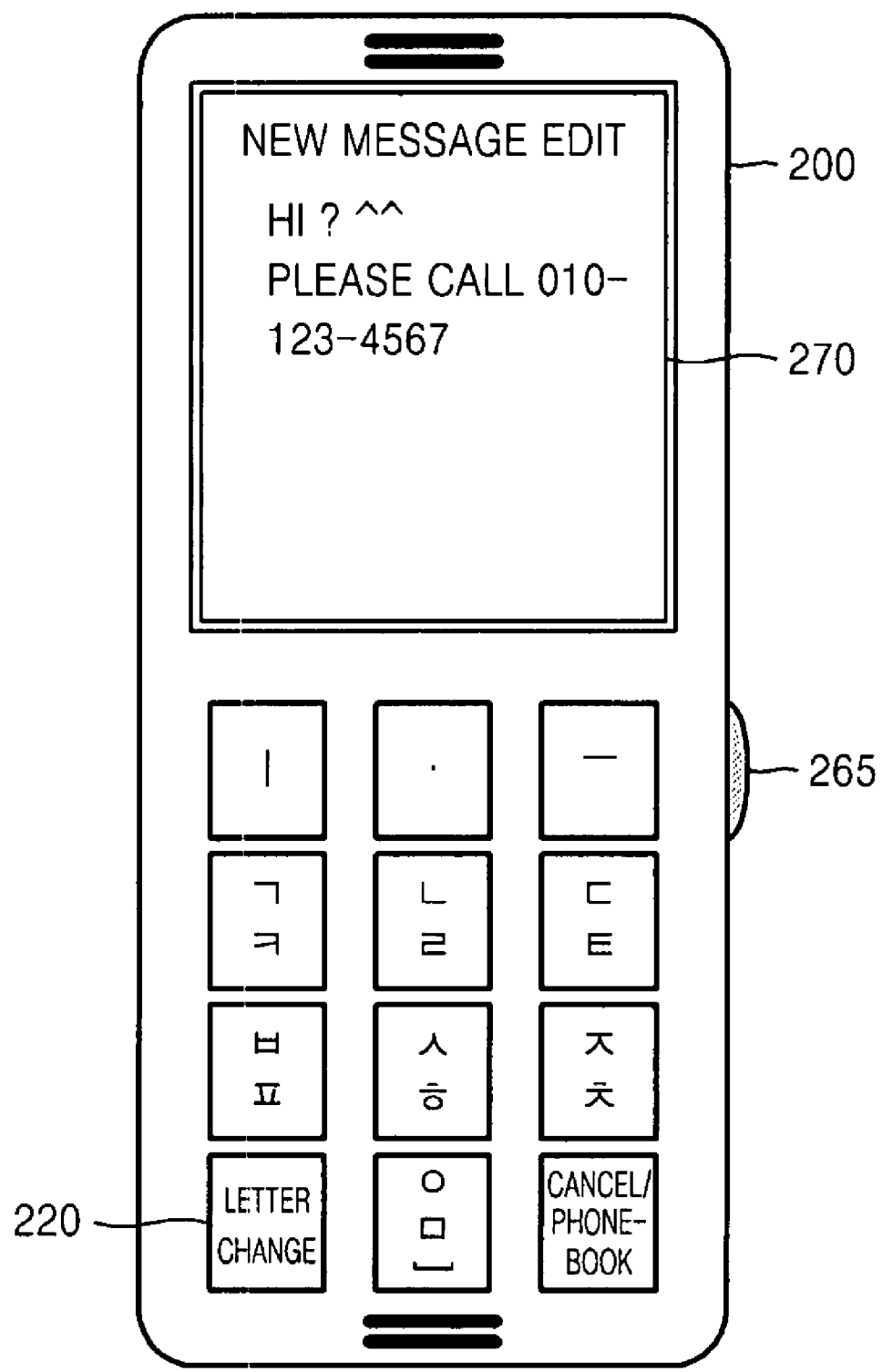

Even if the user does not operate the fourth button 220 illustrated in FIG. 6H, the plurality of buttons 105 through 260 having a display function can display the various Korean consonants, the various Korean vowels, the image denoting the letter change function, and the image denoting the cancel/phone-book function. For example, the user can command the plurality of buttons 205 through 260 to display the various Korean consonants, the various Korean vowels, the image denoting the letter change function, and the image denoting the cancel/phone-book function as illustrated in FIG. 6I by releasing a finger from the thirteenth button 265 after tilting the cellular phone 200 by 45° in the east direction with pressing the thirteenth button 265. To do this, the storage unit 150 may store image data, which indicates the various Korean consonants, the various Korean vowels, the image denoting the letter change function, and the image denoting the cancel/phone-book function, as one of the image data corresponding to the case where 'the cellular phone 200 is tilted by 45° in the east direction'. In this case, the controller 140 reads the image data, which indicates the various Korean consonants, the various Korean vowels, the image denoting the letter change function, and the image denoting the cancel/phone-book function, as image data corresponding to the case where 'the cellular phone 200 is tilted by 45° in the east direction' (the plurality of buttons 205 through 260 display the numerals 0 through 9, the image denoting the letter change function, and the image denoting the cancel function immediately before the cellular phone 200 is tilted) from the storage unit 150. The controller 140 generates a control signal for commanding to display the plurality of images indicated by the read image data and transmits the generated control signal and the read image data to the plurality of buttons 130. Accordingly, the plurality of buttons 130 display the various Korean consonants, the various Korean vowels, the image denoting the letter change function, and the image denoting the cancel/phone-book function as illustrated in FIG. 6I.

The user who has completely edited a short message will try to input a telephone number of a target cellular phone. To do this, it is assumed that if the user operates the twelfth button 260 of the cellular phone 200 illustrated in FIG. 6I, the plurality of buttons 205 through 260 display the numerals 0 through 9, the image denoting an OK/send function, and the image denoting the cancel/phone-book function.

Figure 6J:
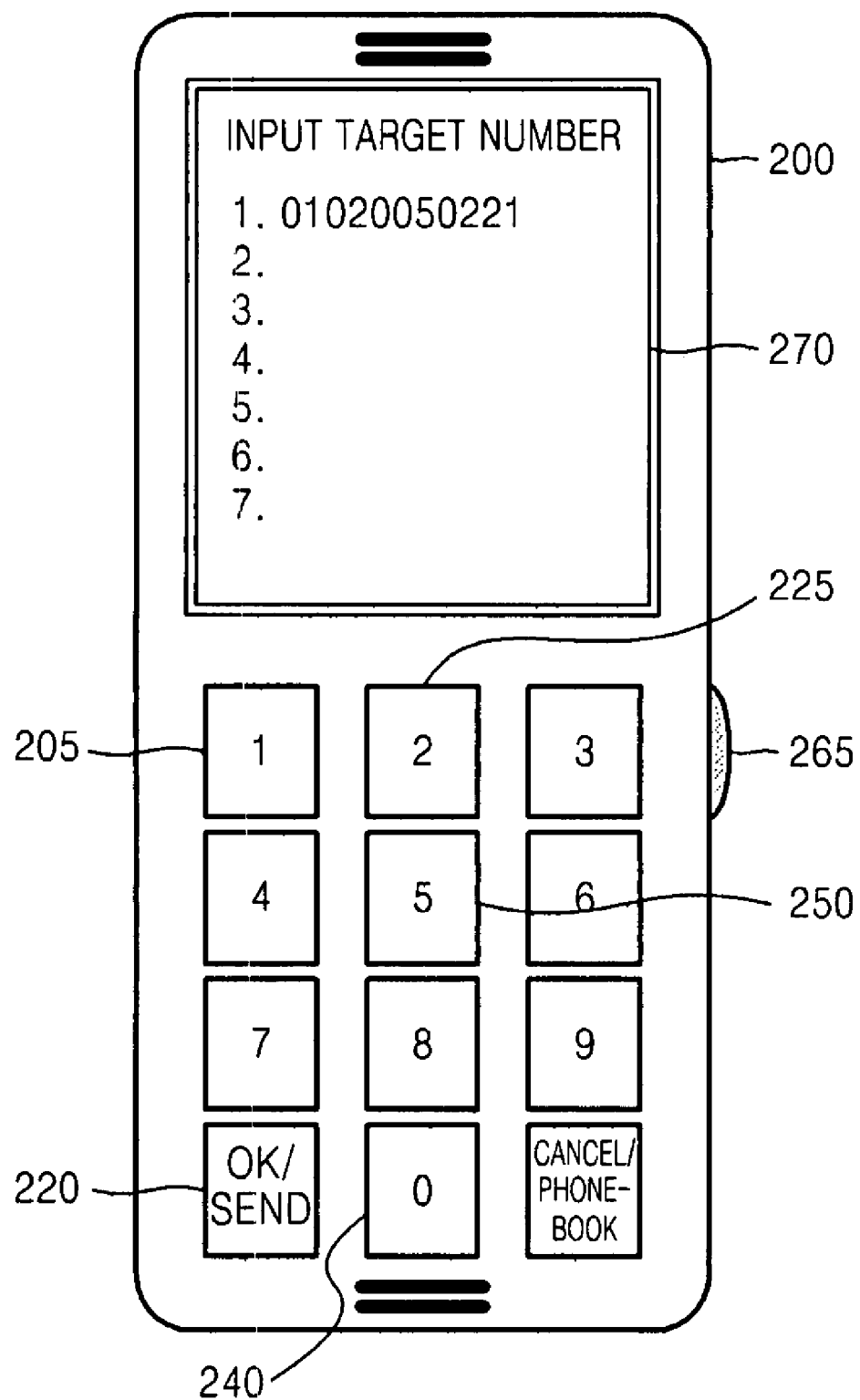

Even if the user does not operate the twelfth button 260 illustrated in FIG. 6I, the plurality of buttons 105 through 260 having a display function can display the numerals 0 through 9, the image denoting the OK/send function, and the image denoting the cancel/phone-book function. For example, the user can command the plurality of buttons 205 through 260 to display the numerals 0 through 9, the image denoting the OK/send function, and the image denoting the cancel/phone-book function as illustrated in FIG. 6J by releasing a finger from the thirteenth button 265 after tilting the cellular phone 200 by 45° in the east direction with pressing the thirteenth button 265. To do this, the storage unit 150 may store image data, which indicates the numerals 0 through 9, the image denoting the OK/send function, and the image denoting the cancel/phone-book function, as one of the image data corresponding to the case where 'the cellular phone 200 is tilted by 45° in the east direction'. In this case, the controller 140 reads the image data, which indicates the numerals 0 through 9, the image denoting the OK/send function, and the image denoting the cancel/phone-book function, as image data corresponding to the case where 'the cellular phone 200 is tilted by 45° in the east direction' (the plurality of buttons 205 through 260 display the various Korean consonants, the various Korean vowels, the image denoting the letter change function, and the image denoting the cancel/phone-book function immediately before the cellular phone 200 is tilted) from the storage unit 150. The controller 140 generates a control signal for commanding to display the plurality of images indicated by the read image data and transmits the generated control signal and the read image data to the plurality of buttons 130. Accordingly, the plurality of buttons 130 display the numerals 0 through 9, the image denoting the OK/send function, and the image denoting the cancel/phone-book function as illustrated in FIG. 6J.

Figure 7:
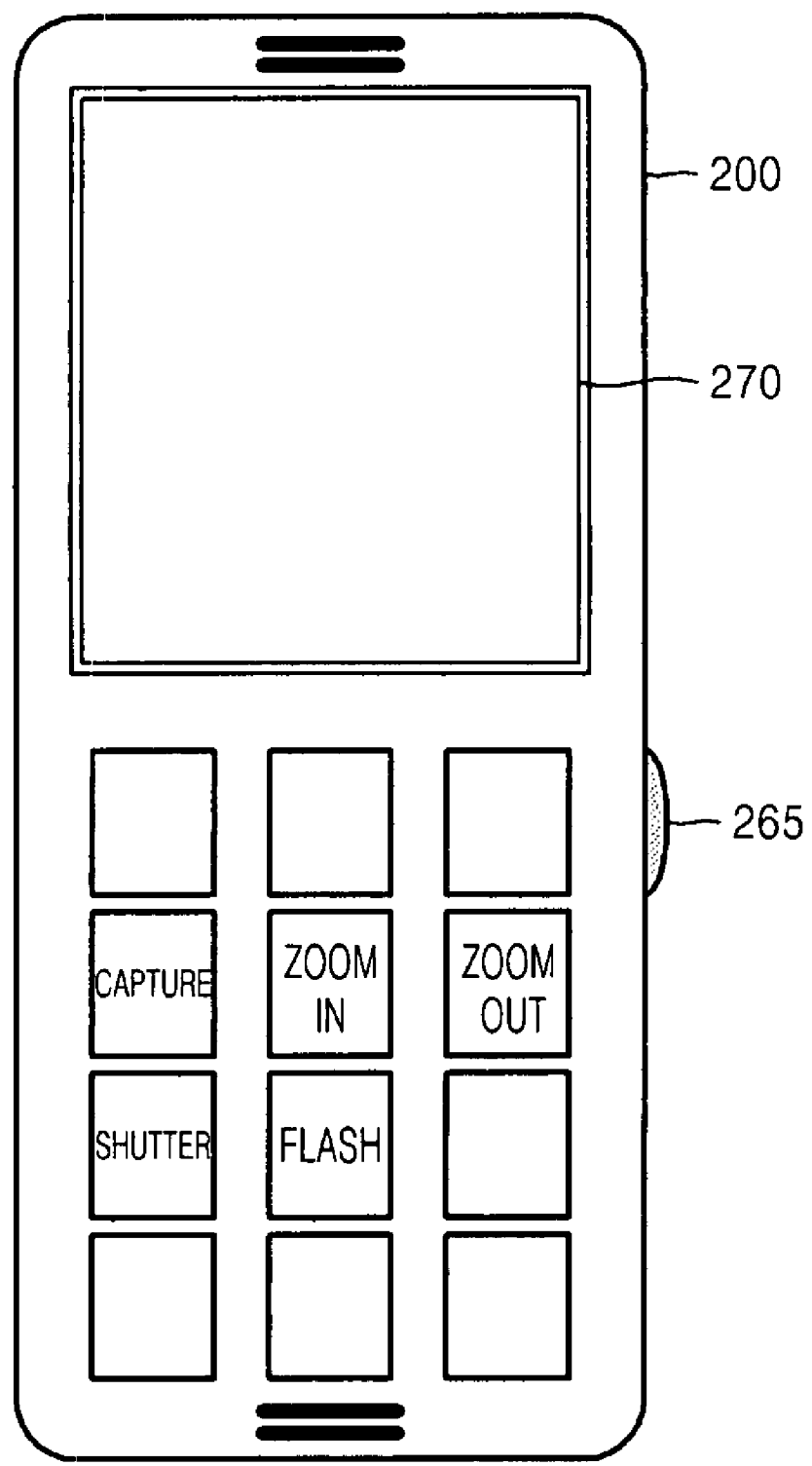
FIG. 7 is a reference diagram for explaining a process of capturing an image using the cellular phone illustrated in FIG. 2, according to an exemplary embodiment of the present invention.

FIG. 7 is a reference diagram for explaining a process of capturing an image using the cellular phone 200 illustrated in FIG. 2, according to an exemplary embodiment of the present invention. The user can command the cellular phone 200 to perform the image capture function by operating a button on which an image denoting the image capture function is displayed. That is, the user can command the plurality of buttons 205 through 260 to display an image denoting capturing, an image denoting a zoom in function, an image denoting a zoom out function, an image denoting a shutter adjustment function, and an image denoting a flash adjustment function, by operating the button on which the image denoting the image capture function is displayed. As illustrated in FIG. 7, the user can adjust shutter by operating the third button 210, zoom in by operating the sixth button 230, adjust flash by operating the seventh button 235, and zoom out by operating the tenth button 250.

Even if the user does not operate the button on which the image denoting the image capture function is displayed, the cellular phone 200 having display buttons can perform the image capture function. For example, the user can command the plurality of buttons 205 through 260 to display the image denoting capturing, the image denoting the zoom in function, the image denoting the zoom out function, the image denoting the shutter adjustment function, and the image denoting the flash adjustment function as illustrated in FIG. 7 by releasing a finger from the thirteenth button 265 after tilting the cellular phone 200 by 30° in the northeast direction with pressing the thirteenth button 265. To do this, the storage unit 150 may store image data, which indicates the image denoting capturing, the image denoting the zoom in function, the image denoting the zoom out function, the image denoting the shutter adjustment function, and the image denoting the flash adjustment function, as one of image data corresponding to a case where 'the cellular phone 200 is tilted by 30° in the northeast direction'. In this case, the controller 140 reads the image data, which indicates the image denoting capturing, the image denoting the zoom in function, the image denoting the zoom out function, the image denoting the shutter adjustment function, and the image denoting the flash adjustment function, as image data corresponding to the case where 'the cellular phone 200 is tilted by 30° in the northeast direction' (the cellular phone 200 is in the initial state immediately before tilted) from the storage unit 150. The controller 140 generates a control signal for commanding to display the plurality of images indicated by the read image data and transmits the generated control signal and the read image data to the plurality of buttons 130. Accordingly, the plurality of buttons 130 display the image denoting capturing, the image denoting the zoom in function, the image denoting the zoom out function, the image denoting the shutter adjustment function, and the image denoting the flash adjustment function as illustrated in FIG. 7.

Figure 8:
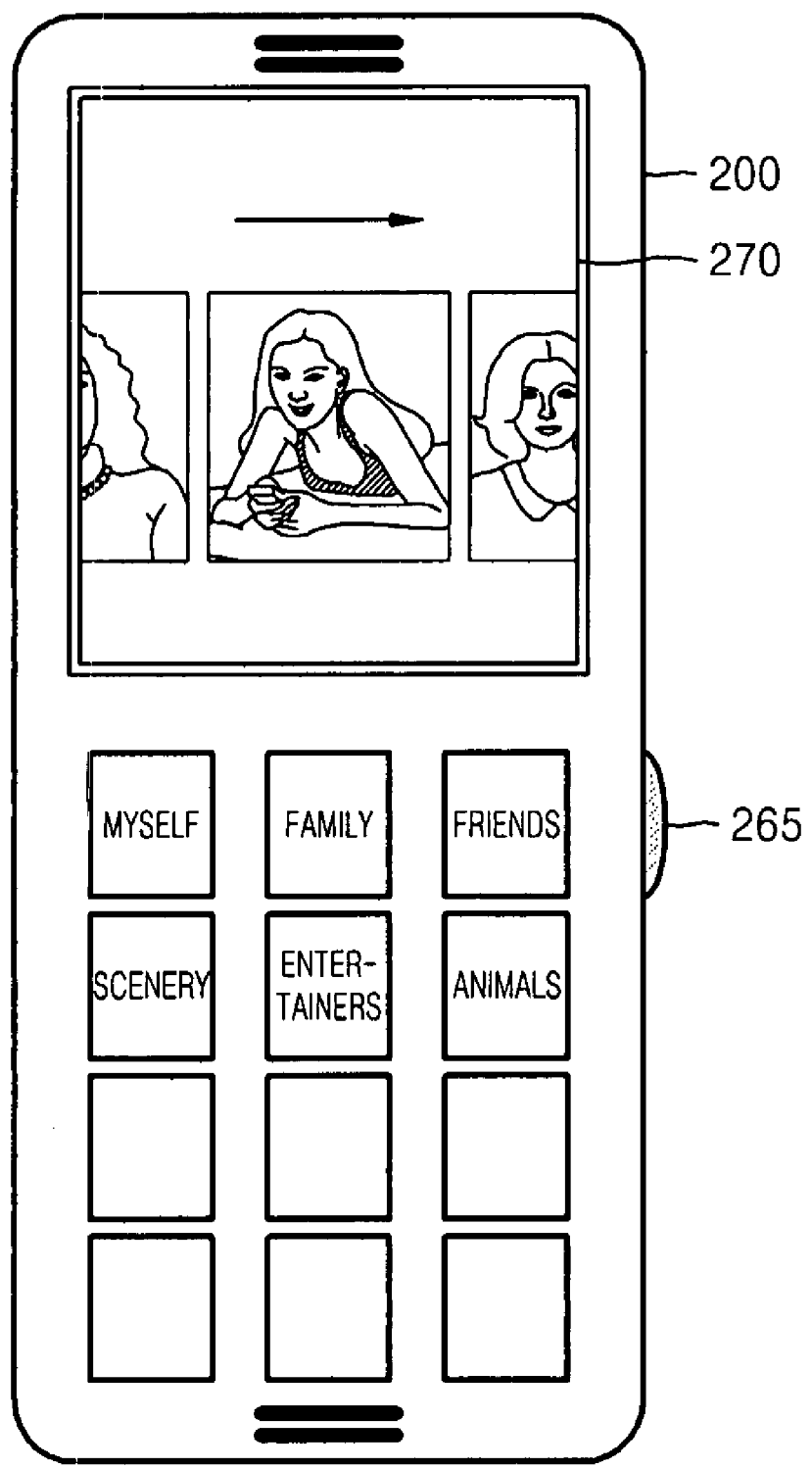
FIG. 8 is a reference diagram for explaining a process of searching for one of image data stored in the cellular phone illustrated in FIG. 2, according to an exemplary embodiment of the present invention.

FIG. 8 is a reference diagram for explaining a process of searching for one of image data stored in the cellular phone 200 illustrated in FIG. 2, according to an exemplary embodiment of the present invention. It is assumed that the cellular phone 200 stores the image data separately according to contents. In FIG. 8, the cellular phone 200 stores the image data separately according to myself, family, friends, scenery, entertainers, and animals.

If the user operates the sixth button 230, the display window 270 displays image data related to the entertainers from among the stored image data. In this state, if the user tilts the cellular phone 200 with pressing the thirteenth button 265, the display window 270 sequentially displays the image data related to the entertainers. In this state, if the user tilts the cellular phone 200 in the east direction with pressing the thirteenth button 265, the displayed image data moves in the arrow direction illustrated in FIG. 8 in the display window 270. If the user tilts the cellular phone 200 in the west direction with pressing the thirteenth button 265, the displayed image data moves in a reverse direction of the arrow direction illustrated in FIG. 8 in the display window 270. If image data that the user desires to search for is displayed while the image data related to the entertainers is being displayed, the user may release a finger from the pressed thirteenth button 265. In this case, the display window 270 continuously displays the image data displayed when the user released the finger from the pressed thirteenth button 265 regardless of tilting of the cellular phone 200.

Figure 9A:
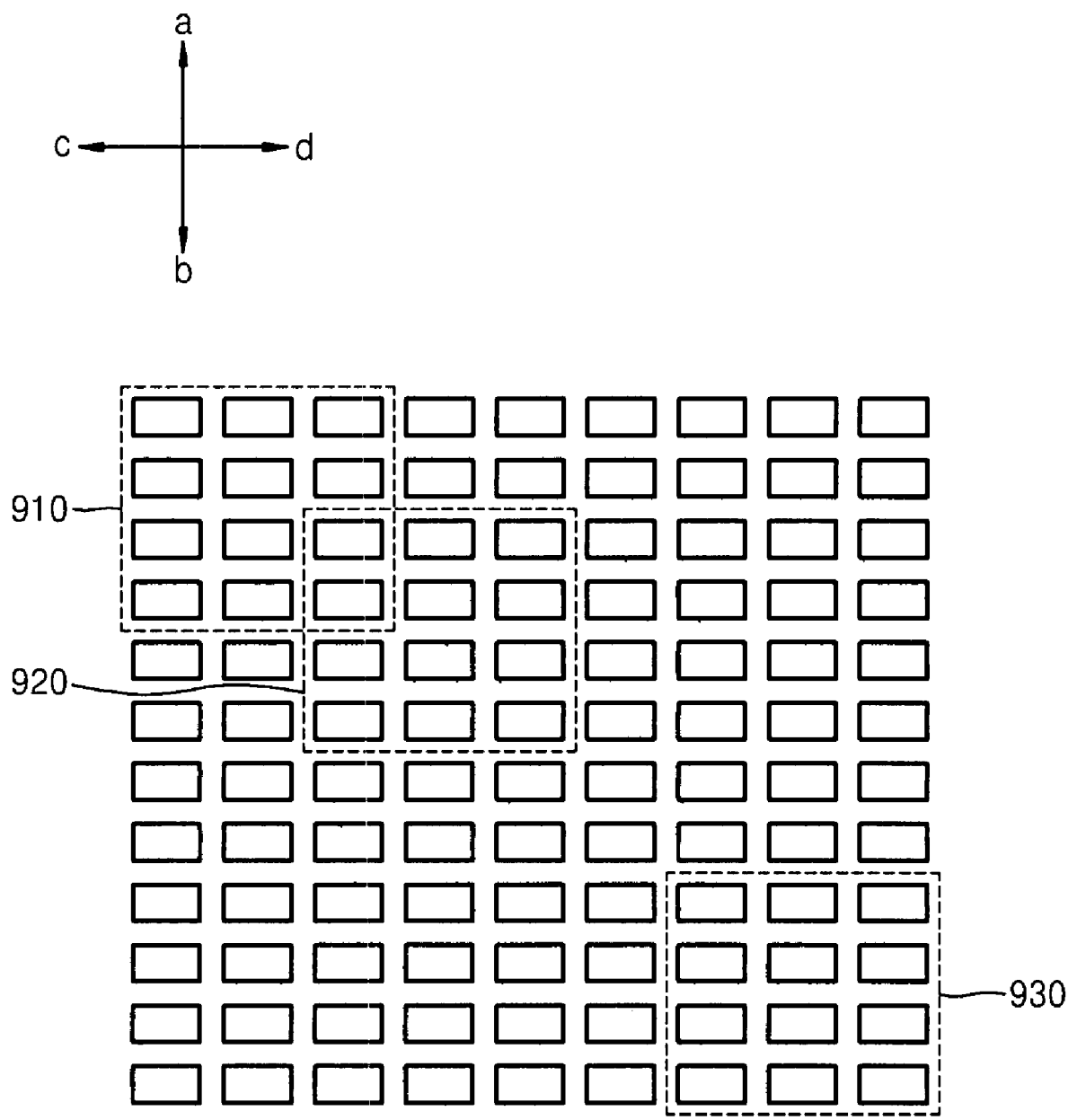
FIGS. 9A and 9B are reference diagrams for explaining a process of searching for one of music data stored in the cellular phone illustrated in FIG. 2, according to an exemplary embodiment of the present invention.
Figure 9B:
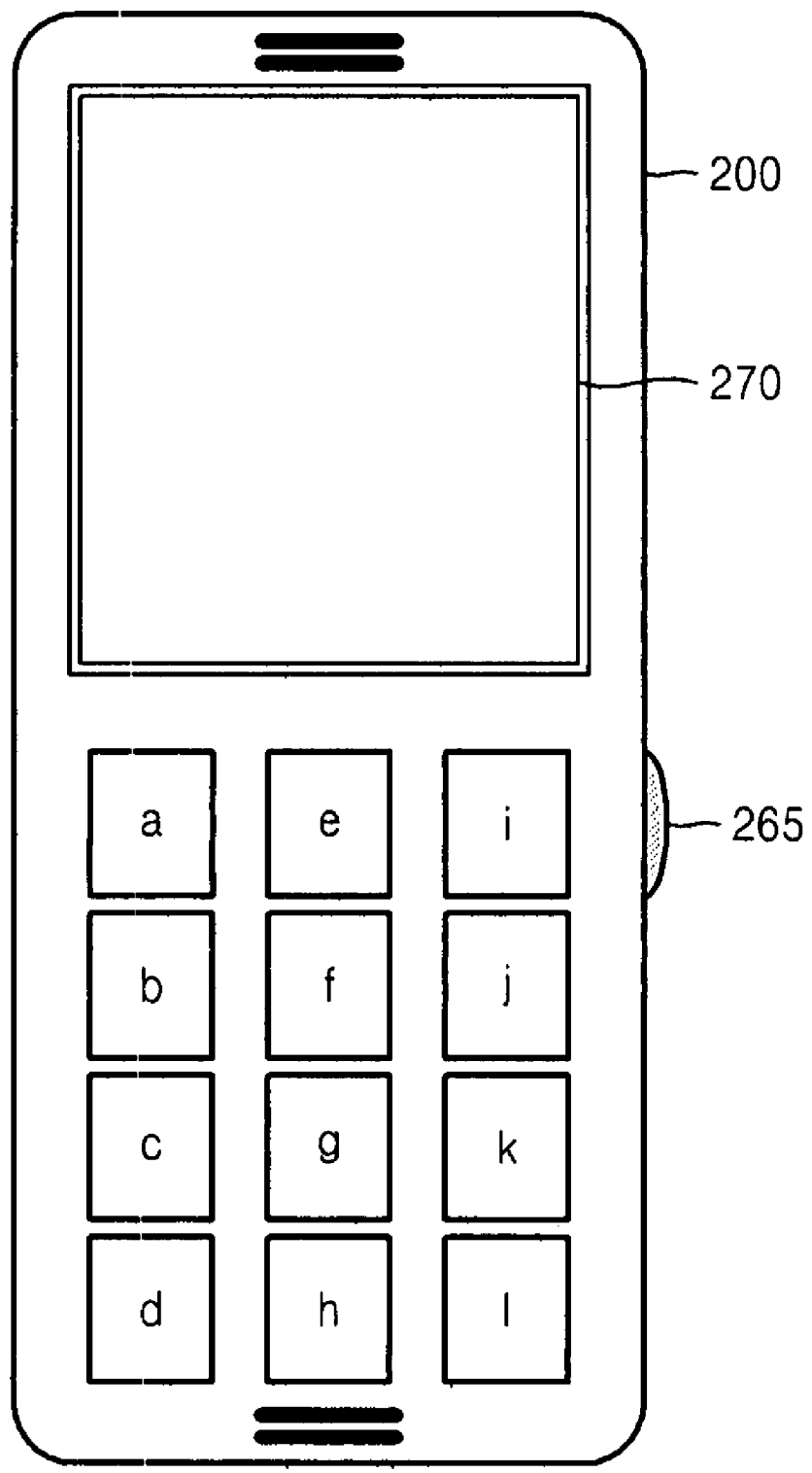

FIGS. 9A and 9B are reference diagrams for explaining a process of searching for one of music data stored in the cellular phone 200 illustrated in FIG. 2, according to an exemplary embodiment of the present invention.

When music data reproducible by the cellular phone 200 is stored in the cellular phone 200, the plurality of buttons 205 through 260 having a display function may display a plurality of images indicating the stored music data.

In FIGS. 9A and 9B, it is assumed that 108 pieces of music data are stored in the cellular phone 200. The plurality of buttons 205 through 260 display 12 images indicating 12 pieces of music data selected from among the stored 108 pieces of music data. Herein, each of the plurality of buttons 205 through 260 can display a file name of music data. For example, the plurality of buttons 205 through 260 can display a.mp3, b.mp3, c.mp3, . . . , k.mp3, and l.mp3 as illustrated in FIG. 9B.

As illustrated in FIG. 9A, 12 rectangles selected from among 108 rectangles indicate the plurality of buttons 205 through 260. Reference numerals 910, 920, and 930 are examples of the selected 12 rectangles.

The 108 pieces of music data may be stored in the cellular phone 200 by being arranged according to a predetermined rule. In FIG. 9A, it is assumed that music data having a slower tempo is arranged in an a direction, music data having a quicker tempo is arranged in a b direction, music data having a longer performance length is arranged in a c direction, and music data having a shorter performance length is arranged in a d direction.

If the user tilts the cellular phone 200 with pressing the thirteenth button 265, 12 images displayed on the plurality of buttons 205 through 260 are updated. For example, if the user tilts the cellular phone 200 in the north direction, i.e., the a direction, with pressing the thirteenth button 265, 12 rectangles selected from among the 108 rectangles move in the a direction. Likewise, if the user tilts the cellular phone 200 in the south direction, i.e., the b direction, with pressing the thirteenth button 265, 12 rectangles selected from among the 108 rectangles move in the b direction. In addition, if the user tilts the cellular phone 200 in the west direction, i.e., the c direction, with pressing the thirteenth button 265, 12 rectangles selected from among the 108 rectangles move in the c direction. Similarly, if the user tilts the cellular phone 200 in the east direction, i.e., the d direction, with pressing the thirteenth button 265, 12 rectangles selected from among the 108 rectangles move in the d direction.

If 12 images indicating 12 pieces of music data that the user desires to search for are displayed while 12 images are being updated and displayed, the user may release a finger from the pressed thirteenth button 265. In this case, the plurality of buttons 205 through 260 continuously display the 12 images displayed when the user released the finger from the pressed thirteenth button 265 regardless of tilting of the cellular phone 200.

When 12 images are being updated and displayed, the display window 270 can display a color indicating a mean value of tempos of selected 12 pieces of music data. In this case, the displayed color can be darker when the mean tempo is slower.

FIGS. 10A through 10C are reference diagrams for explaining buttons of the cellular phone 200 illustrated in FIG. 2, the brightness of backlight or displayed images on which is determined with a tilted figure of the cellular phone 200, according to an exemplary embodiment of the present invention.

As illustrated in FIGS. 10A through 10C, in the cellular phone 200 having display buttons, the brightness of backlight of the plurality of buttons 205 through 260 can be adjusted according to a tilted degree of the cellular phone 200 in order to inform the user of the tilted degree of the cellular phone 200.

In another way, in the cellular phone 200 having display buttons, the brightness of images displayed on the plurality of buttons 205 through 260 can be adjusted according to a tilted degree of the cellular phone 200 in order to inform the user of the tilted degree of the cellular phone 200.

FIG. 11 is a flowchart illustrating a display method for a device having display buttons according to an exemplary embodiment of the present invention. Referring to FIG. 11, the display method includes displaying a plurality of images determined according to a tilted figure of the device on a plurality of buttons included in the device (operations 1110 through 1130).

The sensing unit 110 senses the acceleration of gravity affecting the device on fixed coordinates with respect to the device in operation 1110, and the calculator 120 calculates a tilted figure of the device using a result sensed in operation 1110 in operation 1120.

The plurality of buttons 130 display a plurality of images indicated by image data corresponding to a result calculated in operation 1120 from among prepared image data in operation 1130.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, or DVDs), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. For example, storage/transmission media may include optical wires/lines, waveguides, and metallic wires/lines, etc. including a carrier wave transmitting signals specifying instructions, data structures, data files, etc. The medium/media may also be a distributed network, so that the computer readable code/instructions are stored/transferred and executed in a distributed fashion. The medium/media may also be the Internet. The computer readable code/instructions may be executed by one or more processors. The computer readable code/instructions may also be executed and/or embodied in at least one application specific integrated circuit (ASIC) or Field Programmable Gate Array (FPGA).

In addition, hardware devices may be configured to act as one or more software modules in order to perform the operations of the above-described exemplary embodiments.

The term "module," as used herein, denotes, but is not limited to, a software or hardware component, which performs certain tasks. A module may advantageously be configured to reside on the addressable storage medium/media and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and the modules can operate at least one processor (e.g. central processing unit (CPU)) provided in a device.

The computer readable code/instructions and computer readable medium/media may be those specially designed and constructed for the purposes of the present invention, or they may be of the kind well-known and available to those skilled in the art of computer hardware and/or computer software.

As described above, in a device having display buttons and a display method and medium for the device according to exemplary embodiments of the present invention, since a plurality of images determined according to a tilted figure of the device are displayed on a plurality of buttons included in the device, the size of the buttons does not have to be reduced even though the number of functions available in the device is many, thereby increasing user's convenience for operating the buttons. In addition, since the usage of the buttons is variably displayed all over the buttons without engraving it on the surface of the buttons, even a user who had experienced difficulty to identify the usage of the conventional buttons, which was engraved small on the surface thereof, can easily identify the usage of the buttons. Furthermore, since the usage which the user currently desires to operate is predicted and displayed when the usage of the buttons are displayed, the user does not have to repeatedly press the same button to operate a desired button. In addition, since the number of buttons included in the device can be significantly reduced, market competitiveness can be strengthened through miniaturization of the device.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A device comprising:
a sensor operable to sense acceleration data of the device, wherein the sensor is activated based on an operation of a control button included in the device;
a calculator to calculate tilt data of the device based on the acceleration data;
a plurality of buttons, wherein each button is operable to display an image from among a plurality of images; and
a controller operable to generate a control signal based on the tilt data, wherein the control signal controls the plurality of buttons to change from respectively displaying first images from among the plurality of images to respectively displaying second images from among the plurality of images.

2. The device of claim 1, wherein the sensor is activated while the control button is being operated.

3. The device of claim 1, wherein the sensor is activated from when the control button is operated to when the control button is operated again.

4. The device of claim 1, wherein the sensor is activated only when an operation of the control button begins and when the operation of the control button ends.

5. The device of claim 1, wherein the control button is operated by at least one of pressing and touching.

6. The device of claim 1, wherein the tilt data of the device is at least one of a tilted direction of the device and a tilted degree of the device.

7. The device of claim 1, wherein the plurality of buttons comprise a single display panel.

8. The device of claim 1, wherein the plurality of images is stored inside or outside the device.

9. The device of claim 1, further comprising a main display to display more than one image according to a sequence corresponding to the tilt data.

10. The device of claim 1, wherein at least one of the brightness of each of the plurality of images and the brightness of a backlight of each of the plurality of buttons is adjusted according to the tilt data.

11. The device of claim 1, wherein the acceleration data is based on three-dimensional coordinate data.

12. The device of claim 1, wherein the tilt data of the device includes trend data for at least one of a tilted direction of the device and a tilted degree of the device.

13. The device of claim 1, wherein the first images are selected as a first set from among the plurality of images and the second images are selected as a second set from among the plurality of images.

14. The device of claim 13, wherein at least a portion of the first set is included in the second set.

15. A display method for a device having a plurality of buttons operable to display a plurality of images and a control button, the method comprising:
   sensing acceleration data of the device, wherein the sensing operation is performed based on an operation of the control button;
   calculating tilt data of the device based on the acceleration data;
   displaying on the plurality of buttons respective first images from among the plurality of images; and
   based on the tilt data, changing from displaying the first images to displaying respective second images on the plurality of buttons.

16. The method of claim 15, wherein the tilt data of the device is at least one of a tilted direction of the device and a tilted degree of the device.

17. At least one non-transitory computer readable medium storing computer readable instructions that control at least one processor to implement the method of claim 15.

18. The method of claim 15, wherein the tilt data of the device includes trend data for at least one of a tilted direction of the device and a tilted degree of the device.

19. The method of claim 15, wherein the first images are selected as a first set from among the plurality of images and the second images are selected as a second set from among the plurality of images.

20. The method of claim 19, wherein at least a portion of the first set is included in the second set.

21. A display device comprising:
   a plurality of display buttons, wherein each button is operable to display an image from among a plurality of images, and each image displayed corresponds to an operation which is performable by the device;
   a sensor operable to sense acceleration data of the device, wherein the sensor is activated if a predetermined input is received from a user;
   a calculator to calculate tilt data of the device based on the acceleration data; and
   a controller operable to generate a control signal based on the tilt data, wherein the control signal controls the plurality of display buttons to change from respectively displaying first images from among the plurality of images to respectively displaying second images from among the plurality of images.

22. The device of claim 21, wherein the predetermined input is received from the user via one of the plurality of display buttons.

* * * * *